(12) United States Patent
Kai et al.

(10) Patent No.: US 7,248,221 B2
(45) Date of Patent: Jul. 24, 2007

(54) RADIO TAG ANTENNA STRUCTURE FOR AN OPTICAL RECORDING MEDIUM AND A CASE FOR AN OPTICAL RECORDING MEDIUM WITH A RADIO TAG ANTENNA

(75) Inventors: Manabu Kai, Kawasaki (JP); Yasuyuki Oishi, Kawasaki (JP); Toru Maniwa, Kawasaki (JP); Hiroyuki Hayashi, Kawasaki (JP); Andrey Andrenko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 10/999,690

(22) Filed: Nov. 30, 2004

(65) Prior Publication Data
US 2006/0012527 A1  Jan. 19, 2006

(30) Foreign Application Priority Data
Jul. 13, 2004 (JP) .............................. 2004-205829

(51) Int. Cl.
*H01Q 1/38* (2006.01)
(52) U.S. Cl. .............................. 343/700 MS; 343/872; 343/873
(58) Field of Classification Search ......... 343/700 MS, 343/872, 873
See application file for complete search history.

(56) References Cited

FOREIGN PATENT DOCUMENTS

| EP | 0 997 892 | 5/2000 |
|---|---|---|
| EP | 1 225 585 | 7/2002 |
| JP | 5-23292 | 3/1993 |
| JP | 2000-57296 | 2/2000 |
| JP | 2003-85502 | 3/2003 |
| JP | 2003-141650 | 5/2003 |
| WO | WO 00/23994 | 4/2000 |
| WO | WO 03/17265 | 2/2003 |

OTHER PUBLICATIONS

European Search Report dated Dec. 15, 2005.

*Primary Examiner*—Thuy V. Tran
*Assistant Examiner*—Dieu Hien Duong
(74) *Attorney, Agent, or Firm*—Katten Muchin Rosenman LLP

(57) ABSTRACT

An antenna comprises a dielectric member, an antenna pattern formed on one surface of the dielectric member, and a ground pattern formed on the other surface of the dielectric member. A part or the whole of the antenna is implanted in a dielectric layer on the side from which a laser beam does not come in of an optical recording medium symmetrically having a metal layer reflecting the laser beam and the dielectric layer, thereby to provide a radio tag antenna structure for an optical recording medium which is simple, is small-sized, and can secure necessary reading performance.

18 Claims, 16 Drawing Sheets

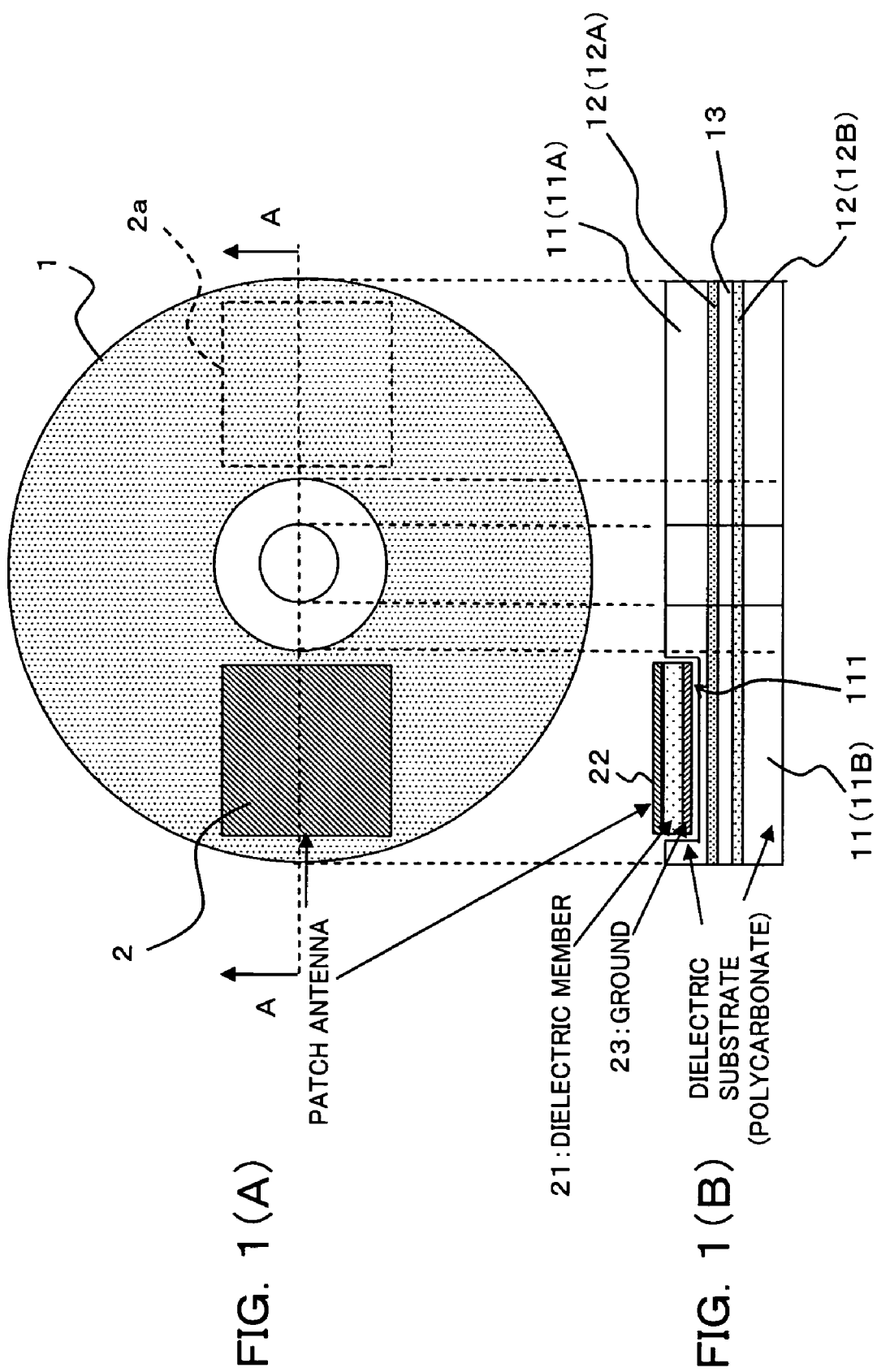

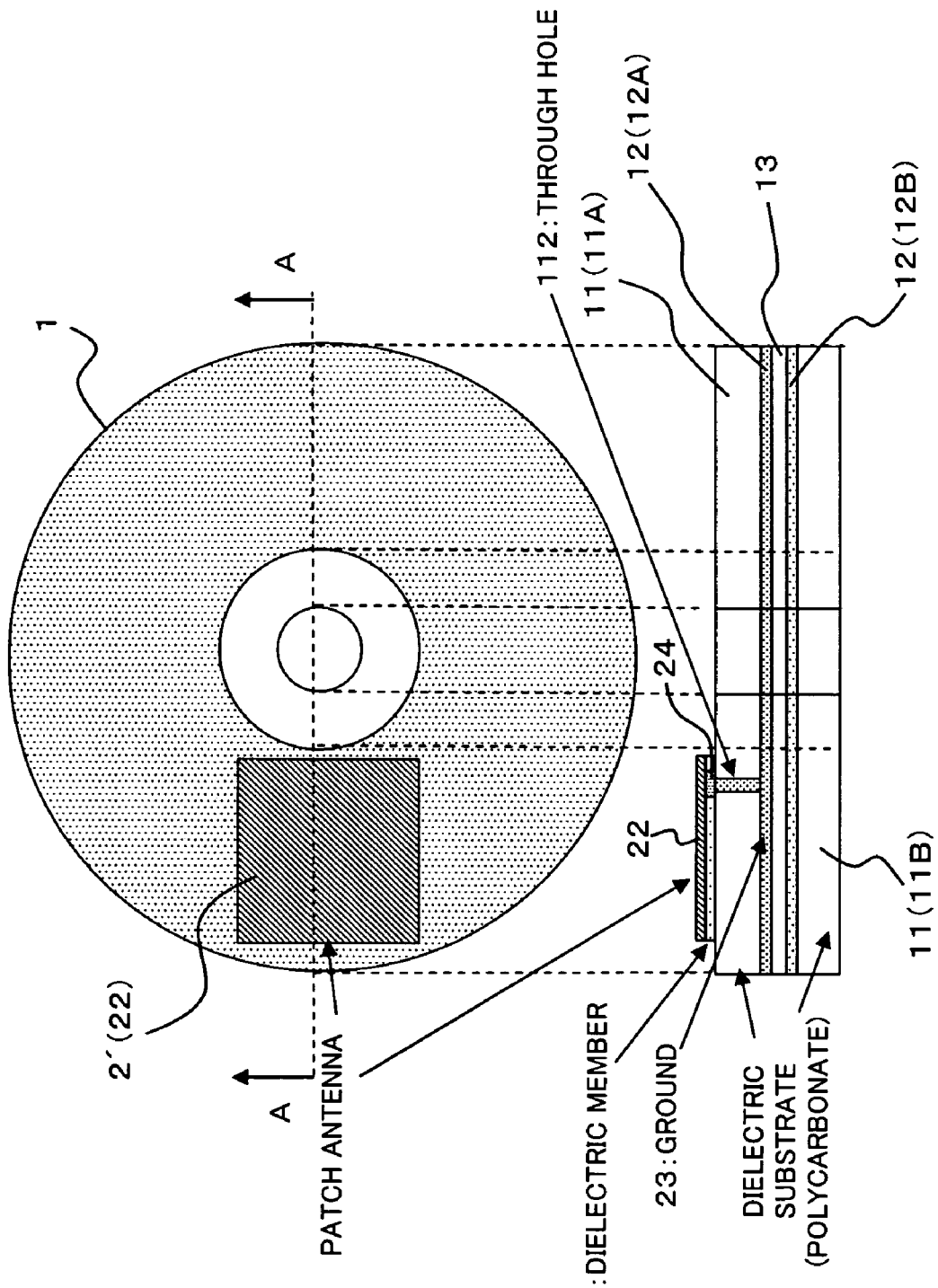

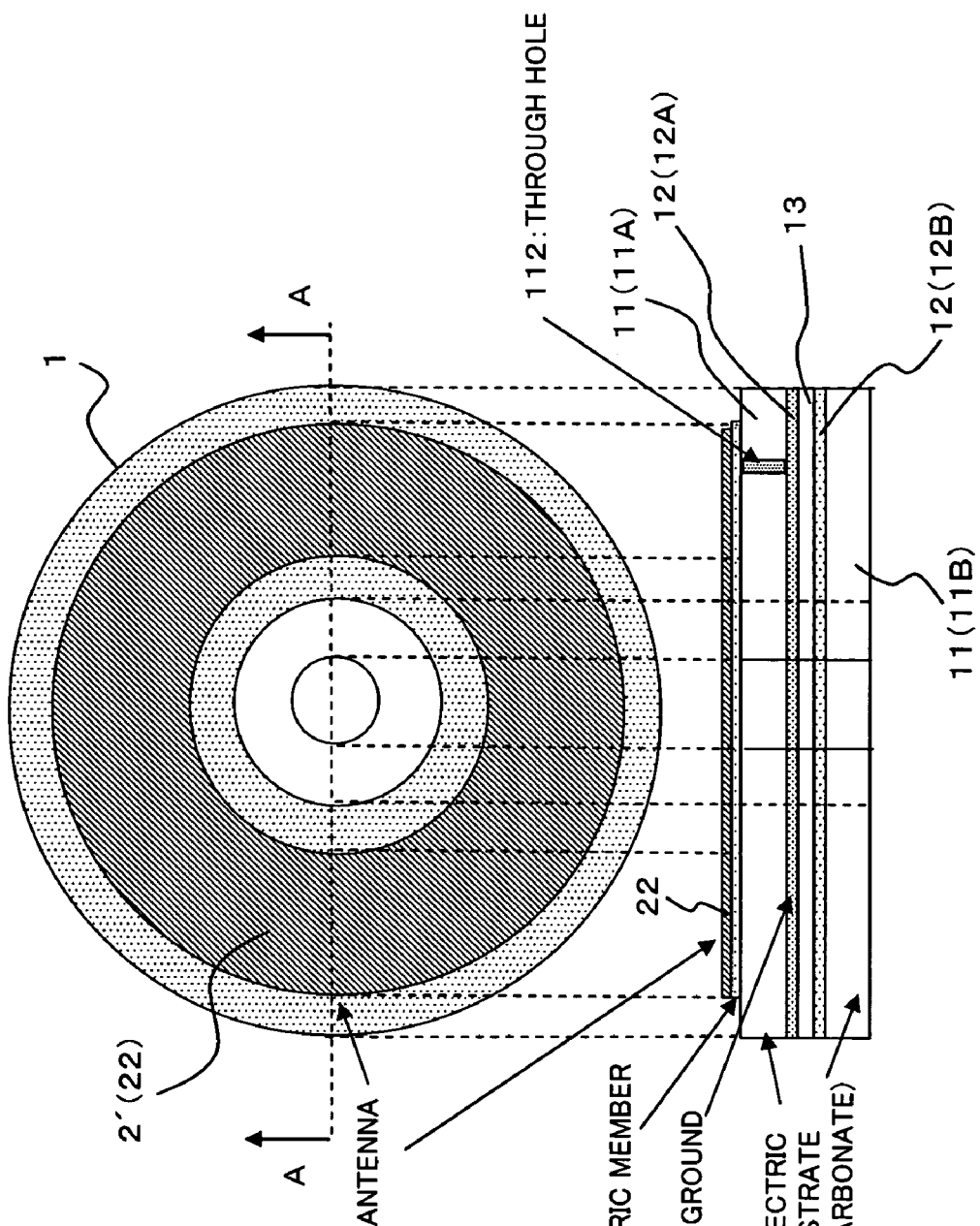

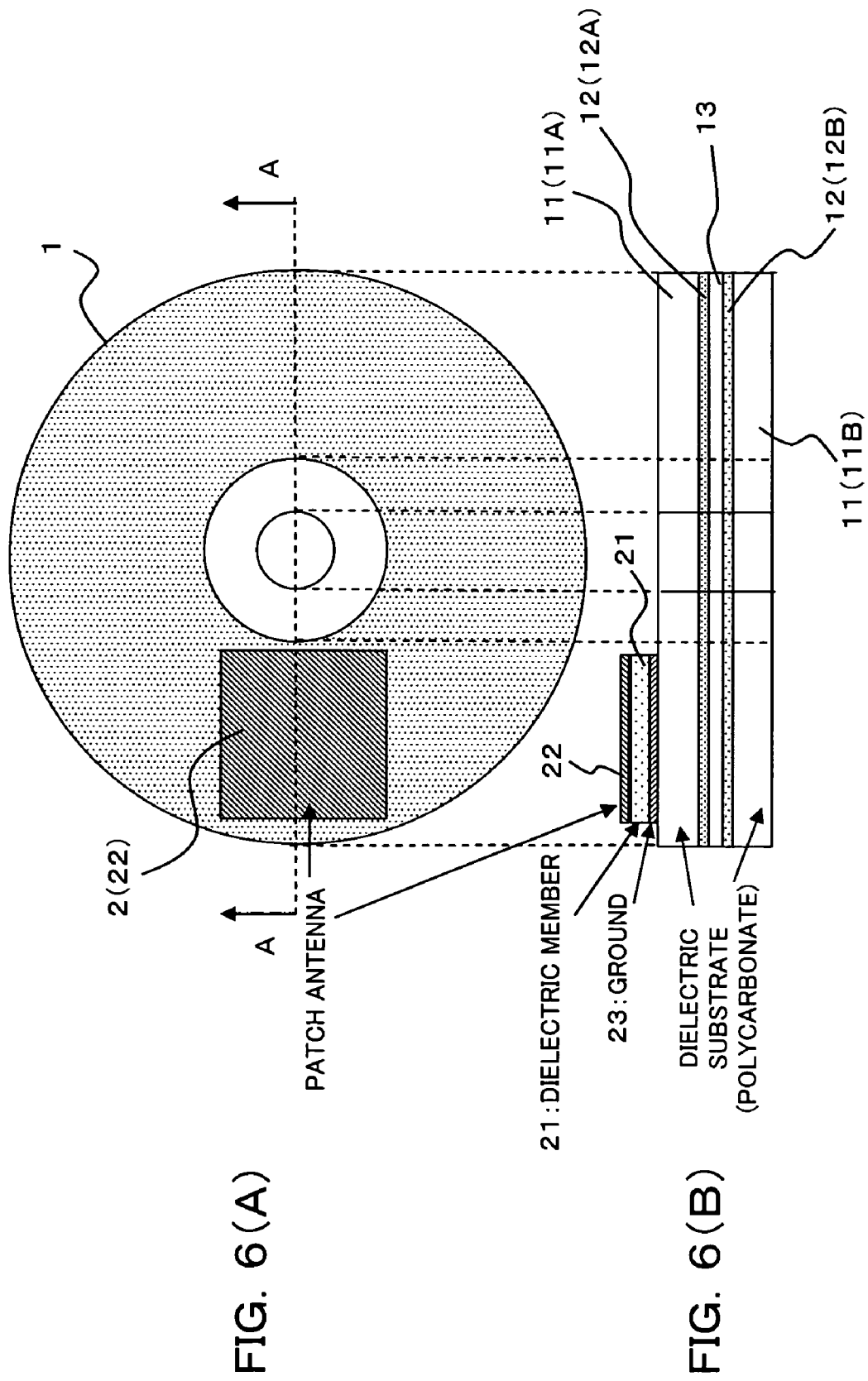

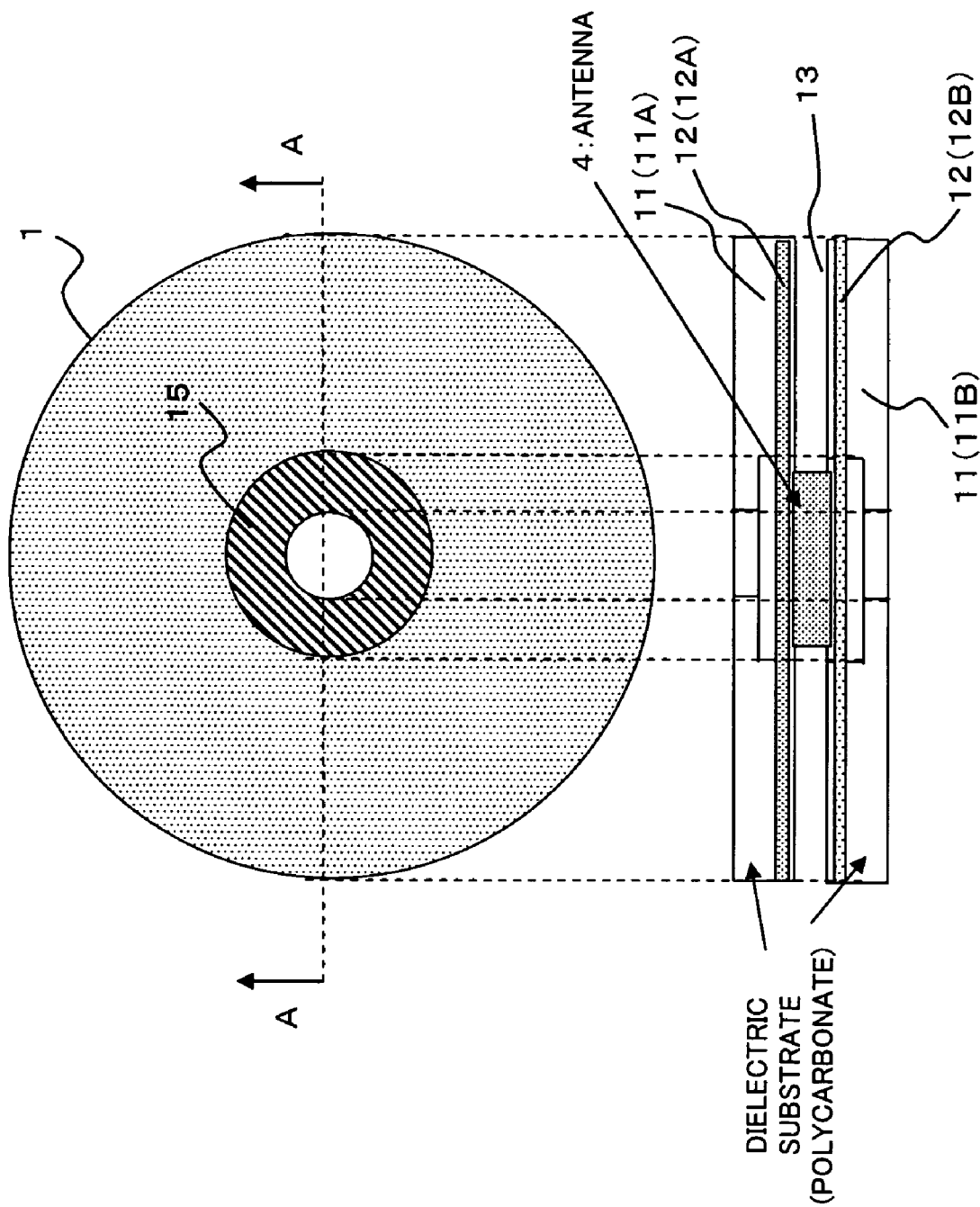

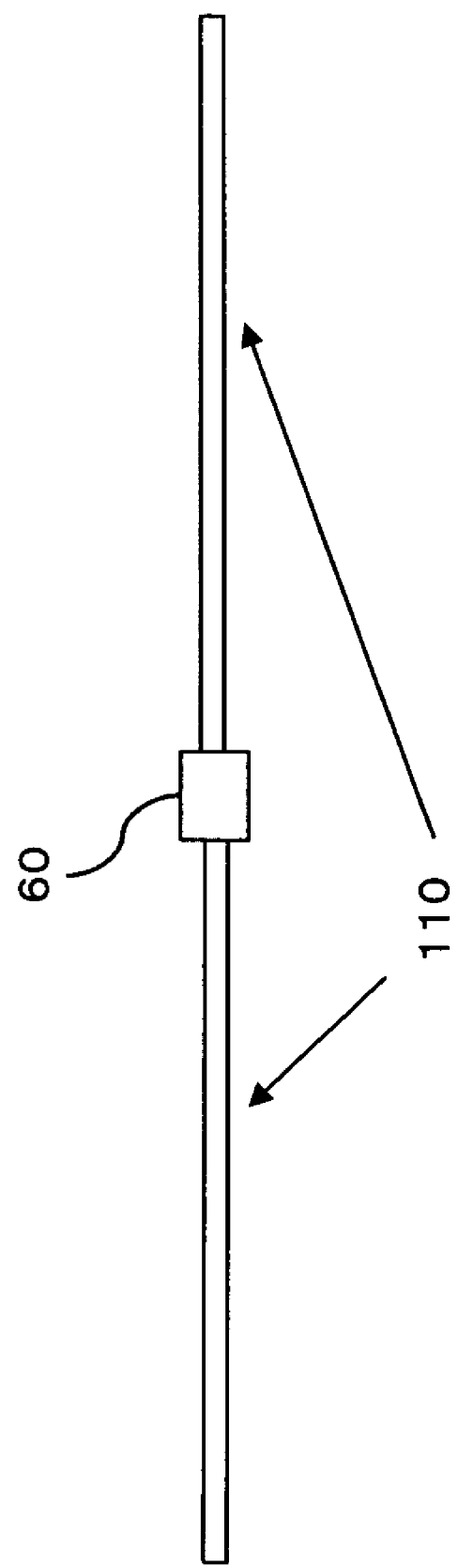

RADIO TAG ANTENNA STRUCTURE FOR AN OPTICAL RECORDING MEDIUM AND A CASE FOR AN OPTICAL RECORDING MEDIUM WITH A RADIO TAG ANTENNA

CROSS REFERENCE TO RELATED APPLICATIONS

This application is based on and hereby claims priority to Japanese Application No. 2004-205829 filed on Jul. 13, 2004 in Japan, the contents of which are hereby incorporated by reference.

BACKGROUND OF THE INVENTION (1) Field of the Invention

The present invention relates to a radio tag antenna structure for an optical recording medium, and a case for an optical recording medium with a radio tag antenna. Particularly, the present invention relates to a technique suitable for use to an optical recording disk medium such as a DVD, a CD or the like.

(2) Description of Related Art

Enthusiastically developed is a radio tag system wherein a reader/writer transmits a high-frequency electromagnetic wave, and a radio tag with an IC (Integrated Circuit) chip storing unique information therein receives the high-frequency electromagnetic wave, and transmits the unique information to the reader/writer. The radio tag is affixed to a book, an article of commerce or the like. The unique information on an object affixed the radio tag thereto is read out by a reader/writer. Additionaly, the unique information can be written in the radio tag. The radio tag generally comprises an IC chip and an antenna. When the radio tag receives a high-frequency signal with the antenna, a rectifier integrated in the IC chip converts the high-frequency signal into direct current components of about 3V (volt), and the IC chip performs signal processing and transmission processing with a power thereof. The frequency used for the radio tag is, for example, a 13.56 MHz band. In recent years, higher frequencies tend to be used such as a UHF band (900 MHz band), a 2.45 GHz band and the like.

A dipole antenna of a flat circuit type 110 having a half-wave length ($\lambda/2$) of the radio signal is often used as the antenna of the radio tag, as shown in FIG. 18, for example. Reference numeral 60 denotes an IC chip having the antenna 110, which performs the signal processing and transmission processing. The radio tag generally has a communicable distance of about 1 m when the transmitted signal from the reader/writer is at about 1 W (watt) although it depends on the shape of the antenna or the power consumption inside the chip. When a UHF band is used, it is known that the communicable distance can be increased from a 13.56 MHz band or a 2.45 GHz band.

As known techniques using a radio tag, there are techniques proposed in patent documents 1 to 4 below.

The technique described in patent document 1 has an object to provide an article identification mark with a burglarproofing function which can be attached to any article, and an article management system using the article identification mark. For example, an antenna of the IC chip is circularly attached about the axis of rotation of a rotary disk such as a CD, a DVD or the like, thereby realizing burglarproofing of an article such as a CD, a DVD or the like and distribution management while preventing unbalance of the rotation (irregularity in the rotation).

The technique described in the patent document 2 relates to an information recording medium and an information recording medium driving apparatus. As shown in FIG. 1 of the patent document 2, for example, a security chip storing password information therein and an antenna for the chip are directly implanted along the circumference of the axis of rotation in a part (in the inner non-recording area of a CD-ROM) of a disk of CD-ROM, an RF reader/writer of a non-contacting type having a password authenticating function is equipped to a device (CD device) which writes in and reads from the CD-ROM, and the RF reader/writer of a non-contacting type reads out a password from the security chip of the CD-ROM mounted on the CD device. Only when the password authentication is successful, the security lock of the CD device is released to allow the device to operate. Whereby, illegal copy of a music CD and the like can be prevented.

The technique described in the patent document 3 relates to an IC tag of a non-contacting type and a manufacturing method thereof. An object of the technique is to provide a tag of a non-contacting type, which does not spoil the stability of an optical disk or the like at the time of high-speed rotation even if attached to an disk-like article such as an optical disk or the like, has excellent electrical efficiency even in communications with a reader, and can stably communicate with the same. The external shape of the non-contacting IC tag is formed almost circular or oval (for example, a doughnut-like shape covering the whole surface of the optical disk), and can be attached to the surface of the optical disk.

The technique described in the patent document 4 relates to an article case with a resonant tag. An object of this technique is to make it difficult to illegally remove the resonant tag from an article case to which the resonant tag is attached as a sensor. For example, the resonant tag is fixed to a supporting plate having the same shape as the surface of a (article) containing case for a CD, the supporting plate is overlap on the case, and the containing case, the supporting plate and the resonant tag are together wrapped in this state.

[Patent Document 1] Japanese Patent Publication No. 2003-141650;

[Patent Document 2] Japanese Patent Publication No. 2000-57296;

[Patent Document 3] Japanese Patent Publication No. 2003-85502; and

[Patent Document 4] Japanese Utility Model Publication No. HEI 5-23292

When a surface (a surface on which a label is attached) on the opposite side to the information reading surface (a surface on which the laser beam is irradiated) is flawed or scratched, the reflective layer or the recording layer is apt to be damaged rather than the reading surface because the protective layer (dielectric layer) on this surface's side is very thin. For this, it is not preferable to directly attach an antenna to the label surface of a CD. As disclosed in the above patent documents 1 through 3, it is general to attach a radio tag to the inner peripheral portion where the recording layer is not formed.

However, with respect to an optical recording medium such as a DVD or the like in which a protective layer in almost the same degree as the protective layer on the information reading surface's side is also formed on the label surface's side like a DVD, attaching the antenna to the inner peripheral portion of the disk is not always the best way. Additionally, a bending work or the like of the antenna, which is not easy, is required because the area of the inner peripheral portion of the disk to which the antenna is attached is limited. An IC chip connected to the antenna has an impedance of about 500 Ω (ohm). Since a general dipole antenna has an impedance of about 72 Ω, their impedances do not match when the chip and the dipole antenna are connected as they are, which causes a disadvantage that the communicable distance is deteriorated, for example.

The above patent documents 1 through 3 disclose that a dipole antenna is formed on the inner portion of a CD or a DVD. This may cause a disadvantage that the communicable distance becomes very short or reading becomes impossible in the worst case when the antenna is connected to an IC chip for a radio tag having high impedance.

SUMMARY OF THE INVENTION

In the light of the above disadvantages, an object of the present invention is to provide a technique which is simple, is small-sized but can secure required reading performance.

Therefore, the present invention provides a radio tag antenna structure for an optical recording medium comprising a dielectric member, an antenna pattern formed on one surface of the dielectric member, and a ground pattern formed on the other surface of the dielectric member and attached to a surface on the side from which a laser beam does not come in of the optical recording medium symmetrically having a metal layer reflecting the laser beam and a dielectric layer for protecting the metal layer.

The present invention further provides a radio tag antenna structure for an optical recording medium comprising an antenna comprising a dielectric member, an antenna pattern formed on one surface of the dielectric member and a ground pattern formed on the other surface of the dielectric member, a part or the whole of the antenna being implanted in a dielectric layer on the side from which a laser beam does not come in of an optical recording medium symmetrically having a metal layer reflecting the laser beam and the dielectric layer protecting the metal layer.

The present invention still further provides a radio tag antenna structure for an optical recording medium having an antenna structure comprising an antenna pattern on one surface of a dielectric member and a ground pattern on the other surface of the dielectric member, and attached to the optical recording medium having a dielectric layer and a metal layer on the side from which a laser beam does not come in, wherein the antenna pattern is formed on a surface of or inside the dielectric layer of the optical recording medium so that the metal layer of the optical recording medium is used as the ground pattern in the antenna structure.

The radio tag antenna structure for an optical recording medium may further comprise a flat antenna member having the antenna pattern formed on one surface of the dielectric member, the flat antenna member being implanted in the dielectric layer of the optical recording medium so that the other surface of the dielectric member of the flat antenna member contacts with the metal layer of the optical recording medium.

The present invention still further provides a radio tag antenna structure for an optical recording medium, which is an antenna structure for a radio tag attached to an optical recording disk medium having a dielectric layer and a metal layer, wherein a part or the whole of an antenna is implanted in a portion of the dielectric layer on which the metal layer is not formed in the optical recording disk medium.

The optical recording disk medium may symmetrically have the dielectric layer and the metal layer about an adhesive layer, and the antenna may be implanted in the adhesive layer on which the metal layer is not formed in the optical recording disk medium.

The antenna may be disposed on the dielectric layer at an inner peripheral portion of the optical recording disk medium. Alternatively, the antenna may be implanted in the adhesive layer at an inner peripheral portion of the optical recording disk medium.

The antenna may be configured as a curved antenna having a curved shape along an inner periphery of the optical recording disk medium.

The present invention still further provides a case for an optical recording medium which has a dielectric layer and a metal layer and is attached an antenna for a radio tag to a portion of the dielectric layer on which the metal layer is not formed, the case comprising a dielectric member disposed on an inner surface of the case at a position corresponding to a position at which the antenna is attached when the optical recording medium is contained in the case.

The present invention provides the following effects and advantages.

(1) Since a radio tag antenna is attached to the dielectric layer on the side on which the laser beam is not irradiated of an optical recording medium symmetrically having a metal layer and the dielectric layer such as a DVD, it is possible to attach the antenna safely and easily without damaging the metal layers (reflective layer and recording layer) of the optical recording medium. Even when a large number of optical recording media have to be managed, it is possible to realize necessary management within a short period of time.

(2) Since a part or the whole of the antenna is implanted in the dielectric layer of the optical recording medium, it is possible to manage each and every optical recording medium (manage the production, prevent burglary, and so forth) by a reading device for a radio tag. As compared with a case where the antenna is attached to the wrapping of an optical recording medium as done heretofore, it is possible to decrease the size of a reading system or the like which collectively reads hundreds of or thousands of stacked optical recording media at a time, or detect the situation where an optical recording medium is pulled out from the case, for example, thereby to improve the security.

(3) The antenna pattern is formed on the surface of or inside the dielectric layer of an optical recording medium so that the metal layer of the optical recording medium is used as the ground pattern of the antenna to configure a flat antenna structure. Whereby, it is possible to secure the electric properties of the antenna, decrease the size of the antenna (realize a thin antenna structure), and decrease the cost.

(4) A structure in which the antenna is implanted in a dielectric layer portion (for example, an inner peripheral portion of a disk optical recording medium) on which the metal layer is not formed allows the whole thickness of stacked optical recording media to have a thickness obtained by multiplying the thickness of one optical recording medium with the number of the stacked optical recording media because no extra space generates between the optical recording media, whereby an increase in size of the reader/writer system can be suppressed (that is, allows the same system to read an increased number of optical recording media at a time)

(5) A dielectric member (having a relative dielectric constant of 1 or more, for example) is disposed at a position on the inner surface of a case for the optical recording medium corresponding to a position at which the antenna of the optical recording medium is disposed when the optical recording medium is accommodated in the case so that the dielectric member contacts with the surface of the antenna attached to the optical recording medium. It is thus possible to shorten the wavelength of the received signal, and reduce the size of the antenna.

BRIEF DESCRIPTION OF THE DRAWINGS

FIG. 1(A) is a schematic plan view of a DVD (Digital Versatile Disk) as being an optical recording disk medium for illustrating a radio tag antenna structure for an optical recording medium according to a first embodiment of this invention;

FIG. 1(B) is a schematic sectional view taken along line A-A of the DVD shown in FIG. 1(A);

FIG. 3(A) is a schematic plan view of a DVD as being an optical recording disk medium according to a second modification of the radio tag antenna structure according to the first embodiment;

FIG. 3(B) is a schematic sectional view taken along line A-A of the DVD shown in FIG. 3(A);

FIG. 5(A) is a schematic plan view of a DVD as being an optical recording disk medium according to a fourth modification of the radio tag antenna structure according to the first embodiment;

FIG. 5(B) is a schematic sectional view taken along line A-A of the DVD shown in FIG. 5(A);

FIG. 6(A) is a schematic plan view of a DVD as being an optical recording disk medium according to a fifth modification of the radio tag antenna structure according to the first embodiment;

FIG. 6(B) is a schematic sectional view taken along line A-A of the DVD shown in FIG. 6(A);

FIG. 8 (A) is a schematic plan view of a DVD as being an optical recording disk medium for illustrating another tag antenna structure for an optical recording medium according to the second embodiment of this invention;

FIG. 8(B) is a schematic sectional view taken along line A-A of the CD shown in FIG. 8(A);

FIG. 10 (A) is a schematic plan view of a CD as being an optical recording disk medium in the case where a dipole antenna is applied to the antenna attachment structure shown in FIGS. 7(A) and 7(B);

FIG. 18 is a plan view showing a structure of a known dipole antenna.

Figures 2A, 2B:
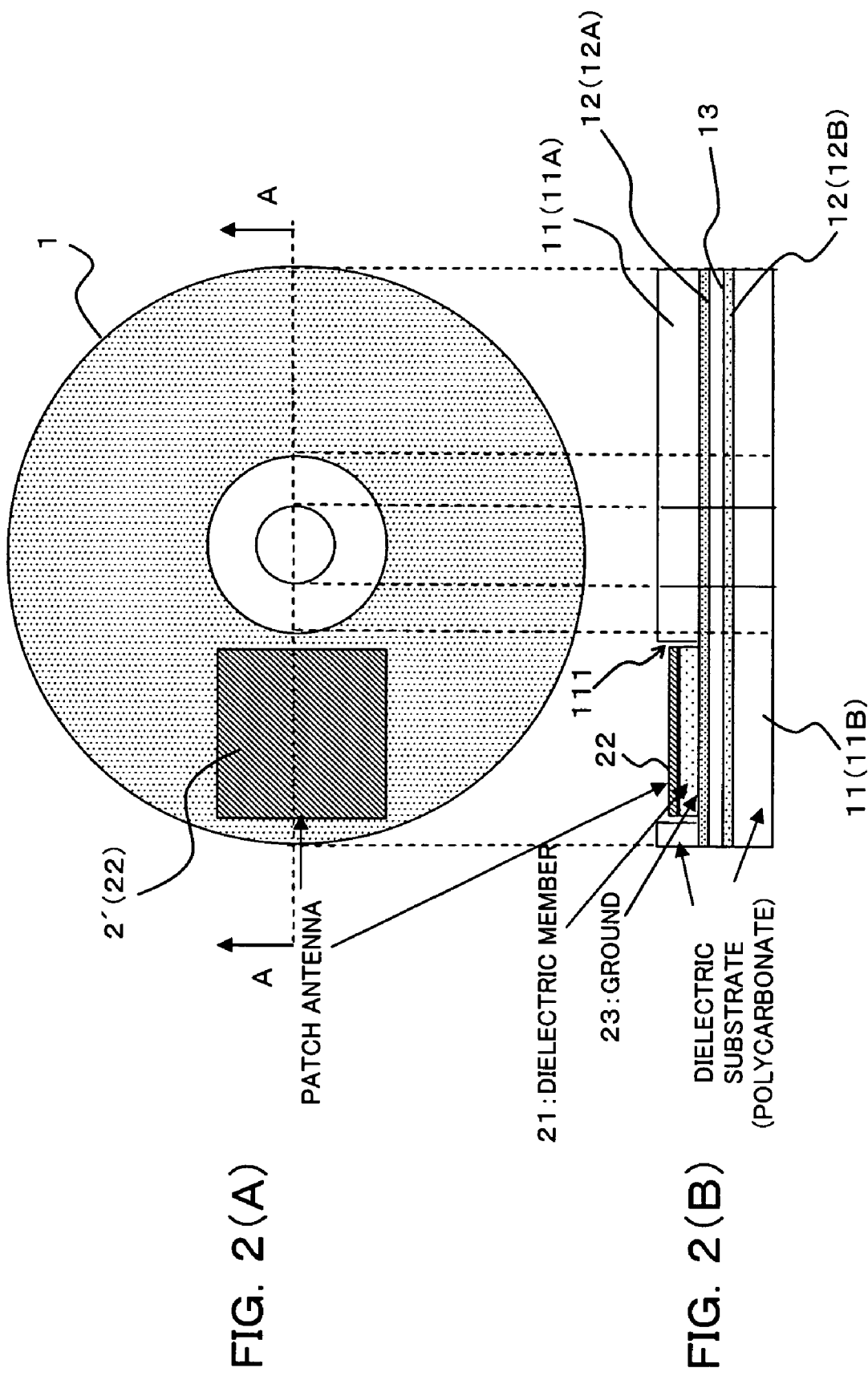
FIG. 2(A) is a schematic plan view of a DVD as being an optical recording disk medium according to a first modification of the radio tag antenna structure according to the first embodiment.
FIG. 2(B) is a schematic sectional view taken along line A-A of the DVD shown in FIG. 2(A)

DESCRIPTION OF THE PREFERRED EMBODIMENTS (A) Description of First Embodiment

FIGS. 1(A) and 1(B) are diagrams each showing a radio tag antenna structure for an optical recording medium according to a first embodiment of this invention. FIG. 1(A) is a schematic plan view of a DVD (Digital Versatile Disk) as being an optical recording disk medium, and FIG. 1(B) is a schematic sectional view taken along line A-A of the DVD shown in FIG. 1(A).

As shown in FIGS. 1(A) and 1(B), the DVD 1 has apparently a similar structure to a CD (Compact Disk). The DVD 1 is generally formed by laminating two disks with an adhesive, each of which has a size according to the standardized specification [for example, an inside diameter of 1.5 cm, an outside diameter of 12 cm (diameter), a thickness of 0.6 mm]. Namely, two disks each of which has a reflective layer (metal layer) 12 (12A, 12B) functioning as a light-reflecting surface formed on one side of a dielectric substrate (dielectric layer) 11 (11A, 11B) are laminated with an adhesive (adhesive layer) such that the reflective layers face to each other. In FIGS. 1(A) and 1(B), a recording layer on which information such as characters, voice, video, image, data and the like is recorded is omitted.

The dielectric substrate 11 (11A, 11B) also functions as a protective layer for protecting the reflective layer 12 and the recording layer, and is generally made of polycarbonate, for example. However, the material is not limited to the above example, but may be another transparent resin material such as an acrylic resin or the like which allows a laser beam to pass therethrough.

The reflective layer 12 (12A, 12B) is a layer reflecting a laser beam for information reading, which is made of an alloy material of silver, gold or the like. The reflective layer 12 (12A, 12B) is formed on the dielectric substrate 11 in spattering or the like. A ultraviolet ray setting resin is generally used for the adhesive layer 13.

According to the first embodiment, as shown in FIGS. 1(A) and 1(B), a recess (space)111 is formed in a part of the region of the dielectric substrate 11 (11A) forming the printing surface (label surface: surface on which the laser beam is not irradiated) opposite to the writing/reading surface [the lower side on the drawing in FIG. 1(B)] of the DVD 1 to accommodate a radio tag comprised of a patch antenna (flat antenna) 2 and a minute IC chip (not less than 1 mm square, for example: not shown) therein. The patch antenna 2 is accommodated in and fixed to the recess together with the IC chip (communication circuit chip). Hereinafter, the patch antenna 2 will signify the whole radio tag including the patch antenna 2 and the IC chip, occasionally.

The recess 111 has a depth equal to the thickness of the dielectric layer 11A (that is, such a depth that a part of the reflective layer 12A is exposed) or smaller than the same (a depth not reaching to the reflective layer 12A) although it depends on the size (thickness) of the patch antenna 2. The patch antenna 2 may be completely implanted in the dielectric substrate 11A or partially implanted so that a part of it comes out to the label surface. It is more preferable that the patch antenna 2 is completely implanted in the dielectric substrate 11A and the label covers the surface of the patch antenna 2 from the standpoint of the appearance and batch reading by a reader/writer.

The patch antenna 2 may be implanted in a CD in a manner similar to the above. However, this is not preferable because the protective layer (dielectric layer) on a side (label surface opposite to the information reading surface (surface on which a laser beam is irradiated) is both very thin, as stated above. In other words, the above manner can be applied to an optical recording medium so long as it has, on the surface on which a laser beam is not irradiated, a dielectric layer (protective layer) having such a thickness that the patch antenna 2 can be implanted in the dielectric layer without exerting an effect on reading and writing of information.

The patch antenna 2 comprises a flat-plate-like dielectric member 21, an antenna pattern (antenna layer) 22 formed on one surface of the dielectric member 21 and a ground (GND) pattern (GND layer) 23 formed on the other surface of the dielectric member 1. The patch antenna 2 is formed into a square shape having a length and a width according to a wavelength (for example, a ½ wavelength or the like) corresponding to a target communication frequency.

The length of the patch antenna 2 determines the resonant frequency, whereas the width of the same determines the fractional bandwidth. The antenna pattern 22 and the GND pattern 23 are made of a conductive film such as a copper foil or the like. When the dielectric constant of the dielectric member 21 used for the patch antenna 2 is not less than 1, it is effective to improve the compactness. Accordingly, the magnitude of the relative dielectric constant is not specifically designated. However, the larger the value of the relative dielectric constant, the more the compactness is improved.

By implanting the radio tag (patch antenna 2) in the dielectric layer 11 of the DVD 1, it becomes possible to manage (manage the production, prevent the burglary, and so forth) each and every DVD 1 by a reading device such as a reader/writer or the like. Since the patch antenna 2 is implanted in the DVD 1 in this example, it is possible to decrease the size of a reading system which collectively reads several hundreds to several thousands of DVDs 1 at a time with the DVDs 1 being stacked as will be described later with reference to FIGS. 16 and 17, or detect a situation that the DVD 1 is pulled out from the DVD case or the like to improve the security, as compared with a case where the patch antenna 2 is attached to the wrapping such as a DVD case or the like as done heretofore.

In the above example, one patch antenna 2 is attached to the DVD 1. Alternatively, it is possible to symmetrically dispose a dummy antenna or another patch antenna, as denoted by broken line 2a in FIG. 1(A). By doing so, it is possible to keep a weight balance (rotation balance) of the DVD 1, thereby to suppress occurrence of irregularity in rotation to the minimum. When not a dummy antenna but another patch antenna is added, it is possible to increase the communication capacity. Disposing a dummy antenna or another patch antenna to keep the rotation balance can be applied to structures to be described later with reference to FIGS. 2 through 4, and 6.

(A1) Description of First Modification

FIGS. 2 (A) and 2(B) are diagrams each showing a first modification of the radio tag antenna structure according to the first embodiment. In this modification, FIG. 2(A) is a schematic plan view of a DVD as being an optical recording disk medium, whereas FIG. 2(B) is a schematic sectional view taken along line A-A of the DVD shown in FIG. 2(A).

As shown in FIGS. 2(A) and 2(B), the DVD 1 is similar in structure to a CD. The DVD 1 has a structure in which two disks are laminated with an adhesive, each of which has an inside diameter of 1.5 cm, an outside diameter (diameter) of 12 cm, and a thickness of 0.6 mm. Namely, two disks, in each of which a reflective layer (metal layer) 12 functioning as a light reflecting layer is formed on one surface of a dielectric substrate (dielectric layer) 11 (11A, 11B), are such laminated with an adhesive (adhesive layer) that the two light reflecting layers 12 face to each other. In FIGS. 2(A) and 2(B), a recording layer on which information such as characters, voice, video, image data and the like is recorded is omitted.

The dielectric substrate 11 (11A, 11B) also functions as a protective layer for protecting the light reflecting layer 12 and the recording layer, like the dielectric substrate 11 described above with reference to FIGS. 1(A) and 1(B). The dielectric substrate 11 is made of a resin material transparent to a laser beam such as polycarbonate, an acrylic resin or the like. The reflective layer 12 (12A, 12B) reflecting the laser beam for information reading is made of an alloy material of silver, gold or the like, and formed on the dielectric substrate 11 in spattering or the like. A ultraviolet ray setting resin is generally used for the adhesive layer 13.

In this modification, as shown in FIG. 2(B), a recess (space) 111 for accommodating a patch antenna (flat antenna) 2' therein is formed in a part of the region of the dielectric substrate 11 (11A) forming the printing surface (label surface) on the opposite side to the writing/reading surface [the lower side on the drawing of FIG. 2(B)] of the DVD 1. The recess 111 has a depth so that the reflective layer 12A is exposed.

Dissimilar to the patch antenna 2 described above, the patch antenna 2' has a structure in which only the antenna pattern 22 is formed on one surface of the dielectric member 21, and no GND pattern is formed on the other surface (flat antenna member). The surface, on which the GND pattern is not formed, of the flat antenna member is so arranged as to contact with the exposed surface of the reflective layer (metal layer) 12A. Whereby, the reflective layer 12A of the DVD 1 functions as the GND pattern of the patch antenna 2'.

According to this modification, the patch antenna 2' (antenna pattern 22) is formed on the surface of or inside the dielectric layer 11A of the DVD 1 so that a flat antenna structure as shown in FIG. 1(B) is formed using the metal layer 12A of the DVD 1 as the GND pattern of the patch antenna 2'.

When the antenna pattern 22 and the GND pattern 23 are formed on the both surfaces of the dielectric member 21, there is possibility that the thickness of the patch antenna 2 [refer to FIGS. 1(A) and 1(B)] having a structure which fulfills the function of an antenna (secures the electric properties) by itself exceeds the thickness of the dielectric layer 11 of the DVD 1. However, by using the reflective layer 12 of the DVD 1 as the GND pattern of the patch antenna 2', it becomes possible to implant the patch antenna 2' in the dielectric layer 11 of the DVD 1 while securing the electric properties of the patch antenna 2'. Accordingly, it is possible to decrease the size (decrease the thickness) of the patch antenna 2' and reduce the cost.

FIG. 2(B) shows that the recess 111 has a depth greater than the thickness of the patch antenna 2' so that the patch antenna 2' is completely implanted in the dielectric layer 11A. Alternatively, it is possible to implant the patch antenna 2' in the dielectric layer 11A so that the surface of the antenna pattern 22 is positioned at the same level as the surface of the dielectric layer 11A excepting the recess 111, or the surface of the antenna pattern 22 comes out to the surface of the dielectric layer 11A. If the patch antenna 2' is completely implanted in the dielectric layer 11A as shown in FIG. 2(B), it is preferable to fill a resin material or the like onto the patch antenna 2' and apply a planarizing process thereon so that the surface of the dielectric layer 11A is flat.

(A2) Description of Second Modification

FIGS. 3(A) and 3(B) are diagrams each showing a second modification of the radio tag antenna structure according to the first embodiment of this invention. In this modification, FIG. 3(A) is a schematic plan view of a DVD as being an optical recording disk medium, whereas FIG. 3(B) is a schematic sectional view taken along line A-A of the DVD shown in FIG. 3(A). This modification differs from the structure shown in FIGS. 1(A) and 1(B) mainly in the following points. Namely, the recess 111 is not formed in the dielectric layer 11A of the DVD 1. But, the patch antenna 2' (antenna pattern 22) not formed the GND pattern thereon is pasted on the surface of the dielectric layer 11A of the DVD 1, directly or through the dielectric member 21, and a through hole 112 leading to the reflective layer 12A of the DVD 1 is formed in the dielectric layer 11A below the patch antenna 2' at which an IC chip 24 connected to the patch antenna 2' is disposed.

In FIGS. 3(A) and 3(B), like reference characters designate like or corresponding parts described above unless not specifically mentioned. In FIGS. 3(A) and 3(B), denoting the dielectric member 21 in parenthesis signifies that the patch antenna 2' is directly arranged on the surface of the dielectric layer 11A of the DVD 1. This is applied to the cases shown in FIGS. 4(A), 4(B), 5(A) and 5(B), as well.

In the structure of this modification, the dielectric layer 11 (11A) of the DVD 1 is (also) used as a dielectric member which is an element of the patch antenna 2', and the reflective layer 12 (12A) of the DVD 1 is (also) used as a GND pattern which is an element of the patch antenna 2' like the above first modification, whereby the electrical properties of the patch antenna 2' can be secured.

A GND terminal of the IC chip 24 is connected to one end of the through hole 112 (not shown). As this, the through hole 112 allows the GND terminal of the IC chip 24 to be connected to the reflective layer 12A of the DVD 1. Namely, the reflective layer 12A of the DVD 1 of this modification has both a function as the GND pattern of the patch antenna 2' and a function as the GND terminal of the IC chip 24.

According to this structure of this modification, only by pasting a patch antenna structural element obtained by forming the antenna pattern 22 on one surface of the dielectric member 21 onto the dielectric layer 11 (11A) of the DVD 1 with the other surface of the dielectric member 21 facing downward, or directly pasting only the antenna pattern 22 onto the dielectric layer 11 (11A), the antenna structure of the original patch antenna is attained, and the electric properties of the patch antenna are secured. It is thus possible to readily attach the radio tag even to a thin optical recording disk medium such as the DVD 1.

Since the through hole 112 connecting the GND terminal of the IC chip 24 to the reflective layer (metal layer) 12 (12A) of the DVD 1 is formed, it becomes unnecessary to form a GND pattern exclusive for the IC chip 24. This largely contributes to a decrease in size of the patch antenna 2' (radio tag) thus decrease the mounting area on the DVD 1.

(A3) Description of Third Modification

Figures 4A, 4B:
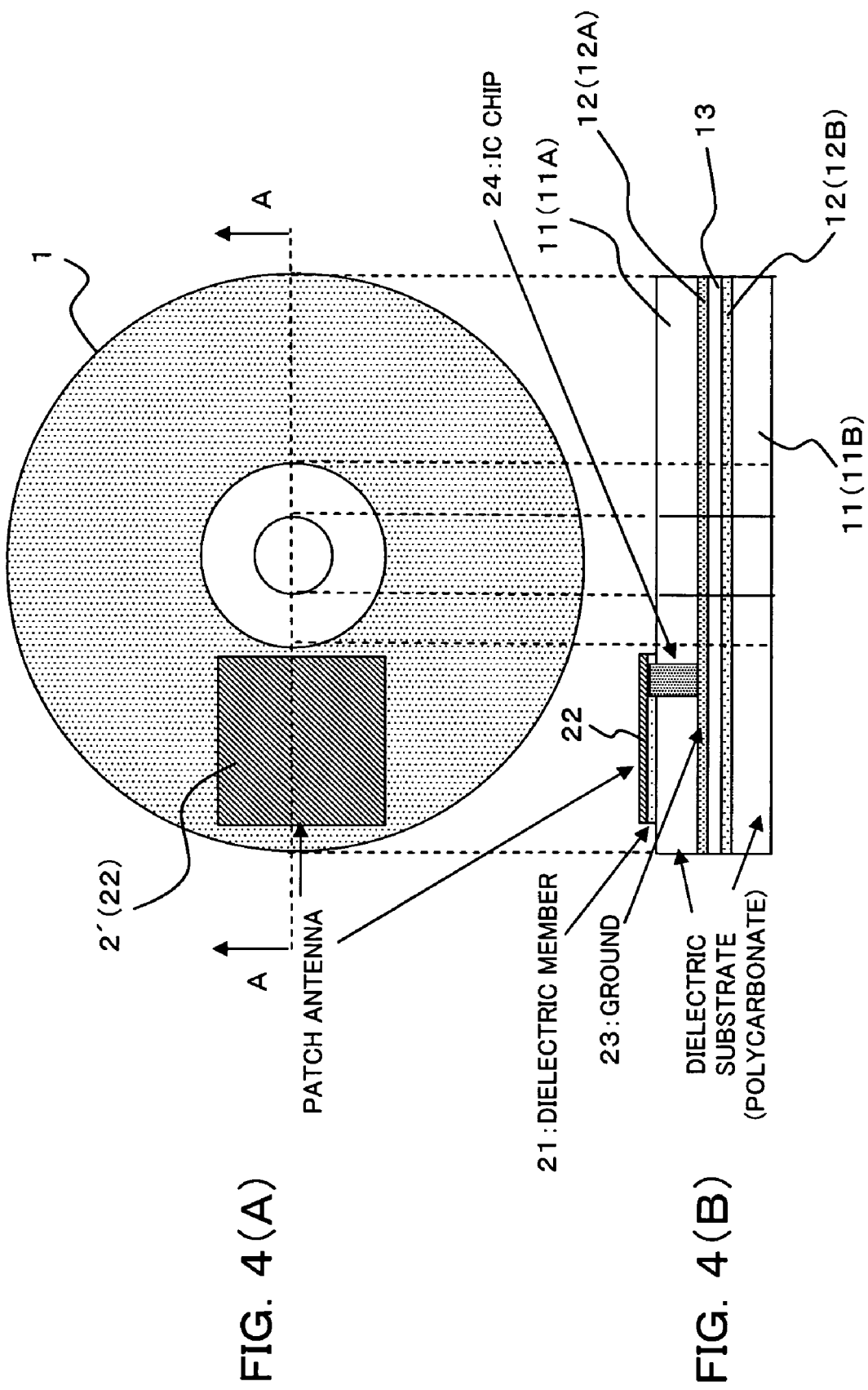
FIG. 4(A) is a schematic plan view of a DVD as being an optical recording disk medium according to a third modification of the radio tag antenna structure according to the first embodiment.
FIG. 4(B) is a schematic sectional view taken along line A-A of the DVD shown in FIG. 4(A)

FIGS. 4(A) and 4(B) are diagrams showing a third modification of the radio tag antenna according to the first embodiment of this invention. In this modification, FIG. 4(A) is a schematic plan view of a DVD as being an optical recording disk medium, whereas FIG. 4(B) is a schematic sectional view taken along line A-A of the DVD shown in FIG. 4(A). This modification differs from the structure shown in FIGS. 1(A) and 1(B) mainly in that an IC chip 24 of the surface mount type is vertically implanted in the dielectric layer 11A of the DVD 1 so that the IC chip 24 directly contacts with the antenna pattern 22 of the patch antenna 2' and the reflective layer 12A of the DVD 1, with the structure described above with reference to FIGS. 3(A) and 3(B) being the fundamental.

In this modification, a signal terminal (not shown) provided on one side of the IC chip 24 is electrically connected directly to the antenna pattern 22, and a GND terminal provided on the other side is electrically connected directly to the reflective layer 12A of the DVD 1, without using the through hole 112 described above in the second modification. In this modification, like reference characters designate like or corresponding parts described above.

With the above structure, this modification can provide the similar functions and effects to those of the second modification. Additionally, since it is unnecessary to form the through hole 112 described above, the manufacturing is easy.

(A4) Description of Fourth Modification

FIGS. 5(A) and 5(B) are diagrams each showing a fourth modification of the radio tag antenna structure according to the first embodiment described above. In this modification, FIG. 5(A) is a schematic plan view of a DVD as being an optical recording disk medium, whereas FIG. 5(B) is a schematic sectional view taken along line A-A of the DVD shown in FIG. 5(A). This modification differs from the structure shown in FIGS. 1(A) and 1(B) mainly in that the antenna pattern 22 (or the antenna pattern 22 and the dielectric member 21) of the patch antenna 2' is formed into a band-like shape (wide-ring-like shape) on the dielectric layer 11A of the DVD 1, and covers, along the circumference of the disk, a part or the whole of a region in which the reflective layer 12 (recording layer) of the DVD 1 is formed, and a through hole 112 similar to the through hole described above with reference to FIGS. 3(A) and 3(B) is formed in the dielectric layer 11A of the DVD 1, with the structure described above with reference to FIGS. 4(A) and 4(B) being the fundamental.

In the structure of this modification, the dielectric layer 11 (11A) of the DVD 1 is used as a dielectric member of the patch antenna 2', and the reflective layer 12 (12A) of the DVD 1 is (also) used as the GND pattern which is a structural element of the patch antenna 2' like the above first modification, whereby the electrical properties of the patch antenna 2' are secured.

Particularly, this modification can improve the communication sensitivity and the communication distance since the antenna has a wide area. Additionally, according to this modification, the reflective layer 12A of the DVD 1 can be used as the GND of the IC chip 24 by connecting the GND terminal of the IC chip 24 connected to the patch antenna 2' to the reflective layer 12A of the DVD 1 through the through hole 112 leading to the reflective layer 12A of the DVD 1, like the structure described above with reference to FIGS. 3(A) and 3(B). Accordingly, it is unnecessary to provide a GND pattern for the IC chip 24 only, and it is possible to contribute to decrease the size of the patch antenna 2' (radio tag) and decrease the mounting area on the DVD 1.

In this modification, the IC chip 24 may be vertically implanted in the dielectric layer 11A of the DVD 1, like the modification described above with reference to FIGS. 4(A) and 4(B).

(A5) Description of Fifth Modification

FIGS. 6(A) and 6(B) are diagrams each showing a fifth modification of the radio tag antenna structure according to the first embodiment described above. In this modification, FIG. 6(A) is a schematic plan view of a DVD as being an optical recording disk medium, whereas FIG. 6(B) is a schematic sectional view taken along line A-A of the DVD shown in FIG. 6(A). In this modification, a patch antenna 2 having the antenna pattern 22 formed on one surface of the dielectric member 21 and the GND pattern 23 formed on the other surface of the same is adhered with an adhesive or the like and fixed to the surface of the dielectric layer 11A on the reflective layer 12A, which is served as a label surface of the DVD 1. In FIGS. 6(A) and 6(B), like reference characters designate like or corresponding parts described above.

Why the patch antenna 2 can be attached to the level surface of the DVD 1 is that the dielectric layer 11A on the level surface's side has a thickness almost equal to that of the dielectric layer 11B on the reading surface's side in the DVD 1, thus has higher resistance to scratch and the like than CD.

As compared with CD, it is possible to attach the patch antenna 2, safely and easily, without damaging the reflective layer 12 or the recording layer of the DVD 1. Even if a large number of DVDs 1 have to be managed, it is possible to realize necessary management within a short time.

(B) Description of Second Embodiment

Figures 7A, 7B:
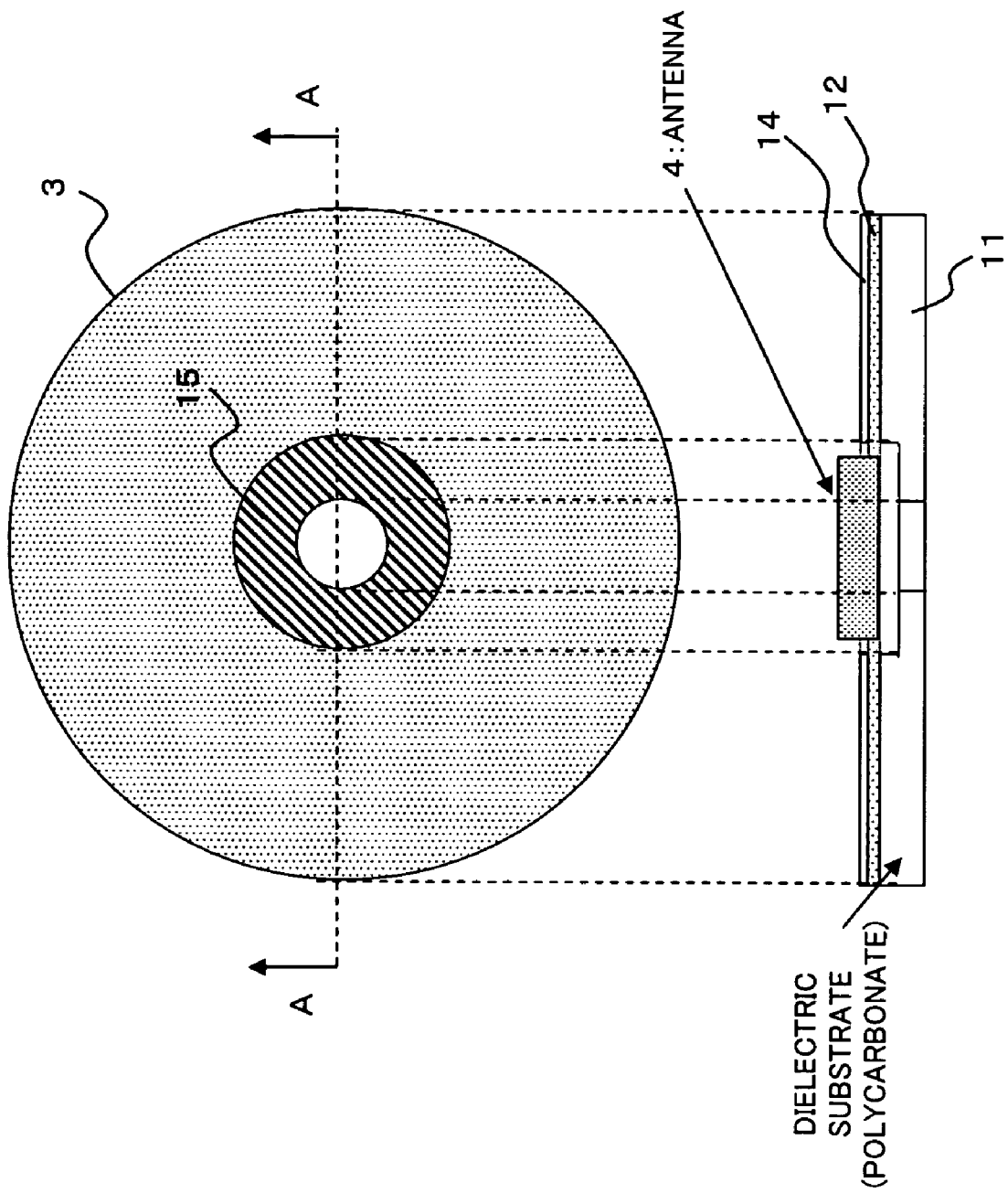
FIG. 7(A) is a schematic plan view of a CD as being an optical recording disk medium for illustrating a radio tag antenna structure for an optical recording medium according to a second embodiment of this invention.
FIG. 7(B) is a schematic sectional view taken along line A-A of the CD shown in FIG. 7(A)

FIGS. 7(A) and 7(B) are diagrams for illustrating a radio tag antenna structure for an optical recording medium according to a second embodiment of this invention. FIG. 7(A) is a schematic plan view of a CD as being an optical recording disk medium, whereas 7(B) is a schematic sectional view taken along line A-A of the CD shown in FIG. 7(A).

As shown in FIGS. 7(A) and 7(B), the CD 3 is sized to have an inside diameter of 1.5 cm, an outside diameter (diameter) of 12 cm and a thickness of 0.6 mm. Generally, a reflective layer (metal layer) 12 is formed on one surface of a dielectric substrate (dielectric layer) 11, and a protective layer 14 is further formed thereon, as shown in FIG. 7(B). In FIGS. 7(A) and 7(B), illustration of a recording layer on which information is recorded is omitted.

In this embodiment, the dielectric substrate 11 also functions as a protective layer for protecting the reflective layer 12 and the recording layer, which is made of a transparent resin material which allows a laser beam to pass therethrough such as polycarbonate, an acrylic resin or the like, as well.

The reflective layer 12 is a layer reflecting the laser beam for reading, which is made of an alloy material of silver, gold or the like, for example. The reflective layer 12 is formed on the dielectric substrate 11 using spattering or the like.

The protective layer 14 is a printing surface on which a label or the like is printed. The protective layer 14 is largely thinner than the dielectric substrate 11. For this, when the protective layer 14 is damaged, the reflecting layer 12 or the recording layer is generally apt to be damaged rather than the dielectric substrate 11, as stated before. In the case of the CD 3, it is not preferable to form an antenna on the level surface.

According to this embodiment, an antenna 4 is formed on an inner peripheral portion 15 (refer to a portion denoted by oblique lines) of the dielectric substrate 11 having the maximum diameter which is not larger than the inside diameter of the reflective layer 12 and the minimum diameter which is not less than the inside diameter of the dielectric substrate 11, as shown in FIG. 7(B). As shown in FIG. 7(B), a space (recess) for implanting a part or the whole of the antenna 4 therein is formed in the inner peripheral portion 15 of the dielectric substrate 11 (hereinafter simply referred to as "inner peripheral portion"), and the antenna 4 is attached to the space. Such structure can be applied to the DVD 1 described above, as well. In the case of the DVD 1, a space for implanting the antenna 4 therein may be formed between the two reflective layers 12A and 12B (namely, in the adhesive layer 13), and the antenna 4 may be implanted in the space, as shown in FIGS. 8(A) and 8(B), for example.

Since the size of shape of the antenna 4 is not specified in FIGS. 7(A), 7(B), 8(A) and 8(B), illustration of the antenna 4 is omitted in the schematic plan views in FIGS. 7(A) and 8(A) [the schematic sectional views in FIGS. 7(B) and 8(B) show only examples of positions at which the antenna 4 is attached].

By employing a structure in which a part or the whole of the antenna 4 is implanted in the inner peripheral potion 15, in which the reflective layer (metal layer) 12 is not formed, of the DVD 1 or the CD 3, it is possible to suppress the effect (deterioration of the performance due to distortion of the magnetic field) brought when the antenna 4 is disposed on the reflective layer (metal layer) 12 of the DVD 1 or the CD 3, thus the performance of the antenna can be prevented from deteriorating. By disposing the antenna in the inner peripheral portion 15, it is possible to keep the stability of rotation of the DVD 1 or the CD 3.

Even when hundreds of the DVDs 1 or the CDs 3 are stacked and read by a reader/writer or the like at a time in managing the production or the like as will be described later, the structure in which the antenna 4 is completely implanted in the inner peripheral portion 15 of the DVD 1 or the CD 3 can suppress the thickness of all the DVDs 1 or the CDs 3 to the thickness obtained by multiplying the thickness of one DVD 1 or the CD 3 with the number of the DVDs 1 or the CDs 3 because no extra space generates between the disks. Accordingly, it is possible to prevent an increase in size of the reader/writer system (namely, it is possible to read a larger number of the DVDs 1 or the CDs 3 at a time by the same system).

Hereinafter, attachment structure of the antenna 4 including practical shapes of the antenna 4 will be described in more detail.

(B1) In the Case of Monopole Antenna

Figures 9A, 9B:
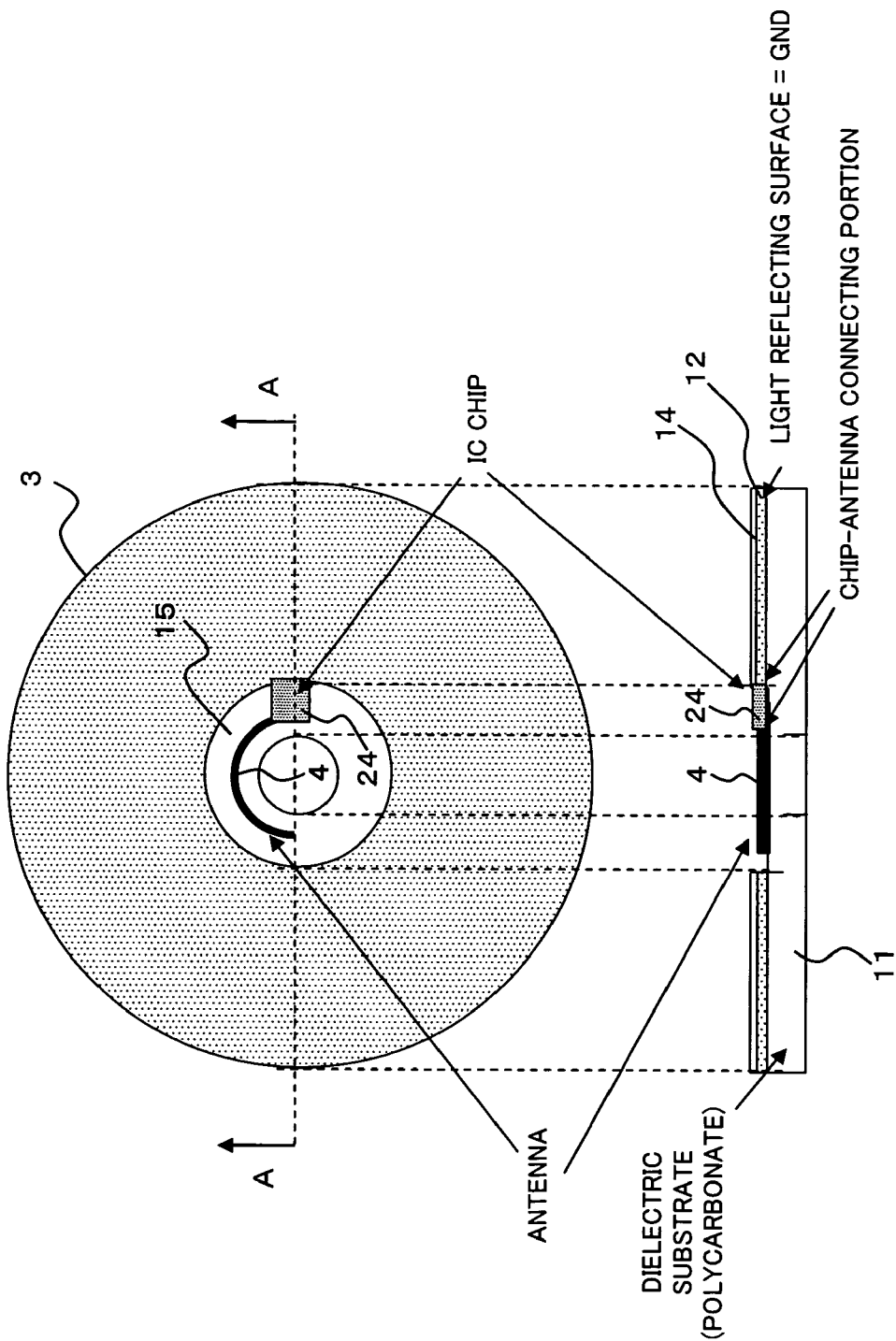
FIG. 9(A) is a schematic plan view of a CD as being an optical recording disk medium in the case where a monopole antenna is applied to the antenna attachment structure shown in FIGS. 7(A) and 7(B)
FIG. 9(B) is a schematic sectional view taken along line A-A of the CD shown in FIG. 9(A)

FIGS. 9(A) and 9(B) are diagrams each showing a case where a monopole antenna is employed as the antenna 4 on the basis of the antenna attaching structure shown in FIGS. 7(A) and 7(B). FIG. 9(A) is a schematic plan view of a CD as being an optical recording disk medium, whereas FIG. 9(B) is a schematic sectional view taken along line A-A of the CD shown in FIG. 9 (A).

As shown in FIGS. 9(A) and 9(B), a monopole antenna whose antenna wire (line) is formed into a circular arc along the inner periphery of the CD (the antenna wire elongating in one direction along the inner periphery) is employed as the antenna 4 in this example. A part or the whole of the monopole antenna 4 is implanted in a space formed in the inner peripheral portion 15 as described above with reference to FIGS. 7(A) and 7(B). In concrete, the monopole antenna 4 and the IC chip 24 are adhered and fixed to the upper surface of the inner peripheral portion 15 of the dielectric substrate 11, and the GND terminal (not shown) of the IC chip 24 is connected to the reflective layer (metal layer) 12 of the CD 3, as shown in FIGS. 9(A) and 9(B). Namely, the reflective layer (metal layer) 12 of the CD 3 in this case is also served as the GND of the IC chip 24.

(B2) In the Case of Dipole Antenna

Figures 10A, 10B:
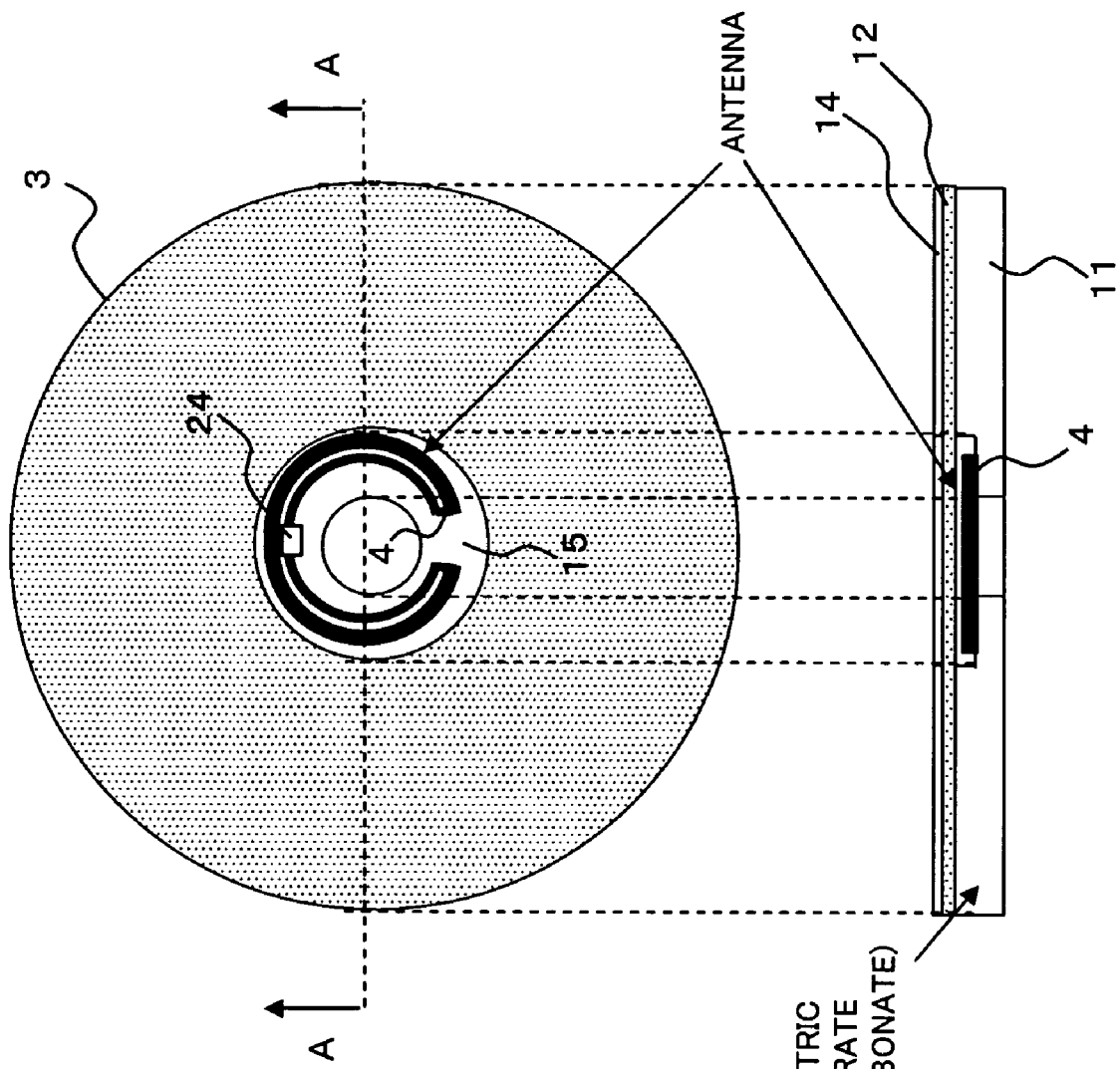
FIG. 10(B) is a schematic sectional view taken along line A-A of the CD shown in FIG. 10(A)

FIGS. 10(A) and 10(B) are diagrams each showing a case where a dipole antenna is employed as the antenna 4 on the basis of the antenna attaching structure shown in FIGS. 7(A) and 7(B). FIG. 10(A) is a schematic plan view of a CD as being an optical recording disk medium, whereas FIG. 10(B) is a schematic sectional view taken along line A-A of the CD shown in FIG. 10(A).

In this example, a small dipole antenna is employed as the antenna 4 to be implanted in the inner peripheral portion 15 of the CD 3 (or the DVD 1). The antenna wire (line) of the small dipole antenna is partially folded back, and the width of the antenna wire on the outer peripheral side is greater than the width of the antenna wire on the inner peripheral side, as shown in FIG. 10(A). In FIGS. 10(A) and 10(B), like reference characters designate like or corresponding parts described above.

Why such folded dipole antenna is employed here is mainly that the impedance of the patch antenna is matched with the impedance of the IC chip 24. Namely, since the impedance of the IC chip 24 for the radio tag is higher than the impedance of the antenna wire portion, received information is not accurately transmitted to the IC chip only by forming the antenna wire portion into a shape of a simple circular arc as shown in FIG. 9(A). Thus, it is necessary to increase the impedance of the antenna wire portion to equalize the impedance of the antenna wire portion to the impedance of the IC chip 24.

According to this example, the both antenna wires of the dipole antenna are such folded that a part of the circle is broken and a loop-like shape is formed with the IC chip 24 positioned at the center (at this time, care should be taken not overlapping the antenna wires on one anther) to increase the length of the antenna wire. By making the width of the antenna wire on the outer peripheral side greater than the width of the antenna wire on the inner peripheral side, the impedance of the antenna is not less than about four times the impedance of the general dipole antenna.

As above, the impedance of the antenna wire portion is increased to be almost equal to the impedance of the IC chip so that the impedance of the antenna wire portion is matched with the impedance of the IC chip 24. Whereby, a necessary performance (electrical properties) of the antenna as being a radio tag antenna can be secured.

When a number of CDs 3 are stacked in order to read the CDs 3 at a time for the management or the production of the CDs 3 as will be described later with reference to FIGS. 16 and 17(A) through 17(C), the effective dielectric constant around the antenna wire is higher than the air because the dielectric layers 11 are positioned close to the both sides of the antenna 4. Thus, it is possible to shorten the wavelength of the received signal, and decrease the necessary antenna wire length as compared with a case where only one CD 3 (DVD 1) is read out.

Figure 11:
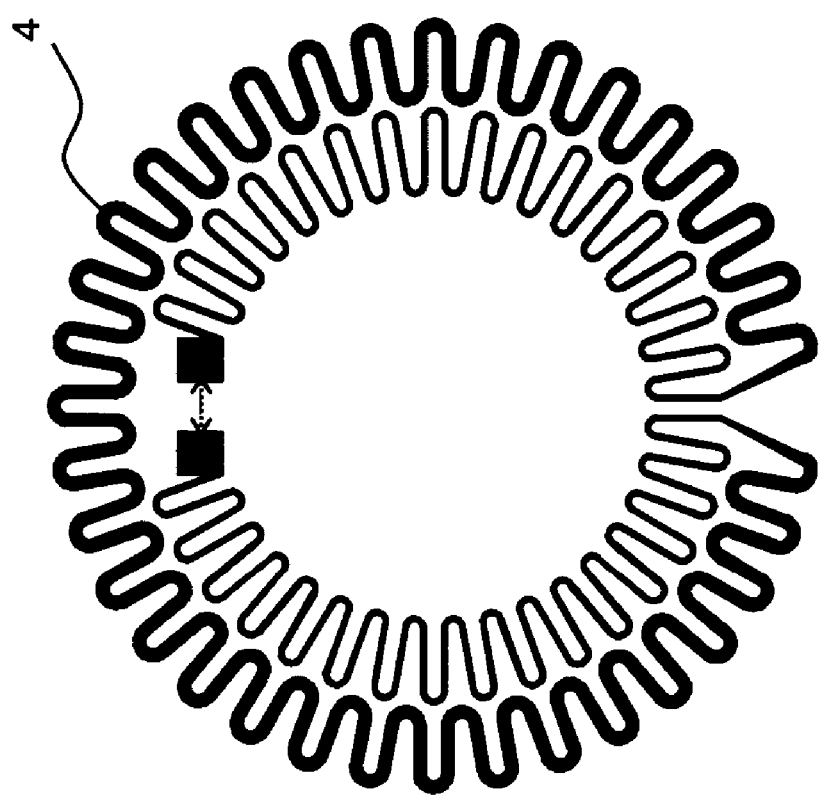
FIG. 11 is a schematic plan view showing a modification of the antenna shown in FIGS. 10(A) and 10(B)

Incidentally, the number of times the above antenna wire is folded may be two or more. When it is desired to increase the length of the antenna wire in order to sufficiently read even one CD 3 or (DVD 1), the antenna wire is formed into a wave-like shape as shown in FIG. 11, for example, whereby a necessary antenna wire length can be secured even when the area of a portion (the inner peripheral portion 15) at which the antenna 4 is attached is limited as this example. In this case, the antenna wire on the outer peripheral side has a greater width than the antenna wire on the inner peripheral side like the case shown in FIG. 10, whereby the impedance is increased.

(B3) Description of Modification

Figure 12:
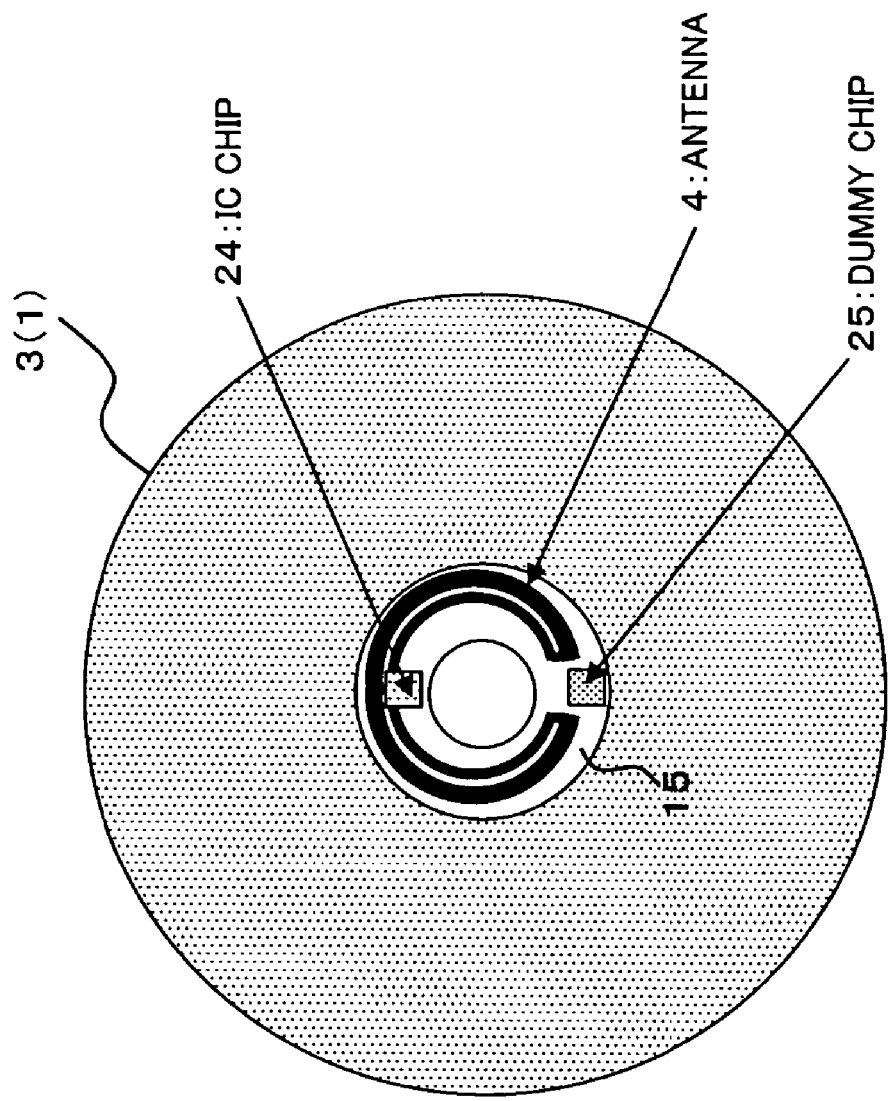
FIG. 12 is a schematic plan view showing a structure in which a dummy chip (or another IC chip) is provided to the structure shown in FIGS. 10(A) and 10(B)
Figure 13:
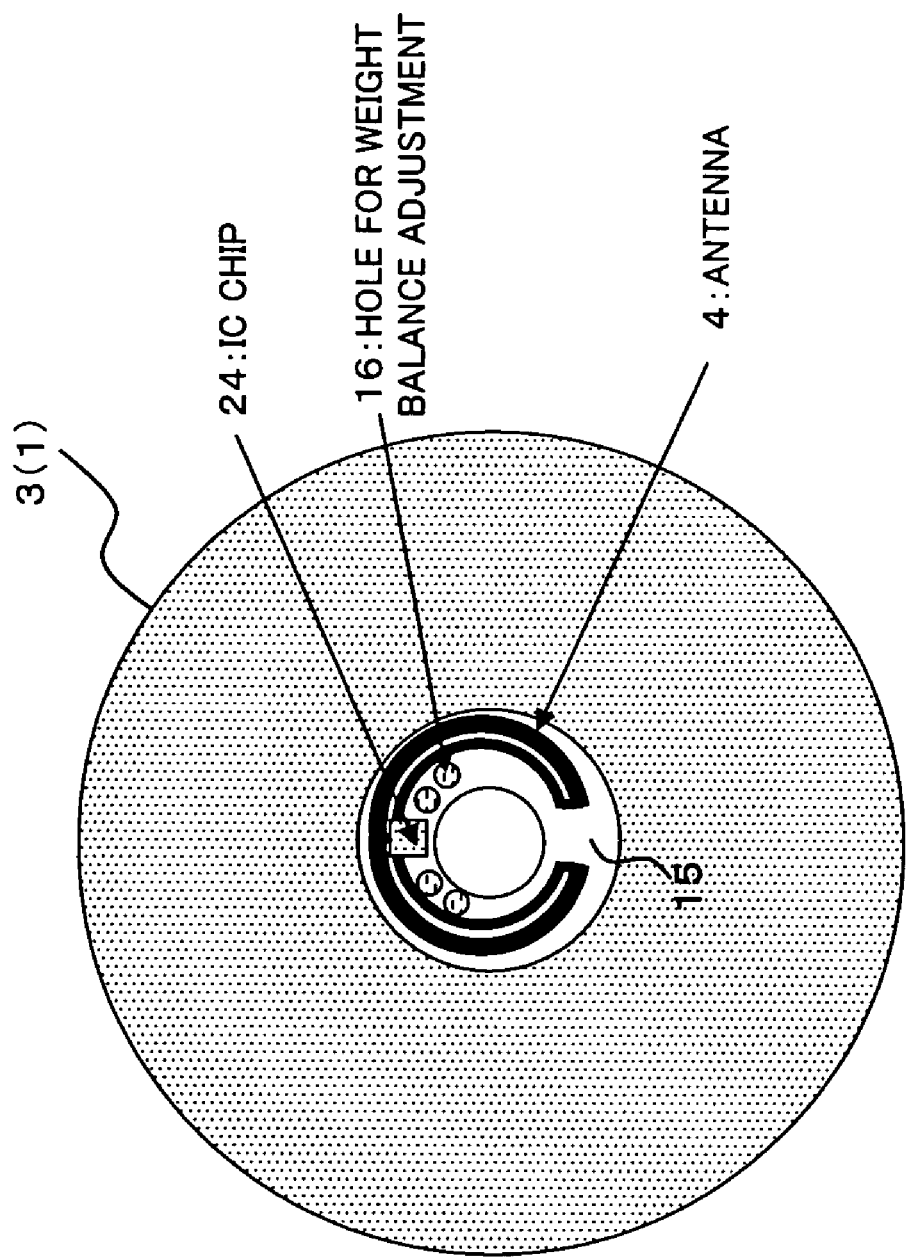
FIG. 13 is a schematic plan view showing a structure in which holes for weight balance adjustment are formed in an inner peripheral portion of a dielectric member in the vicinity of an IC chip in the structure shown in FIGS. 10(A) and 10(B)

When the folded (wave-like shaped) dipole antenna 4 is disposed in the inner peripheral portion 15 of the CD 3 or the DVD 1 as described above with reference to FIG. 10 (FIG. 11), a dummy chip 25 (or not a dummy chip but another IC chip) may be disposed at a position opposite to the position at which the IC chip 24 is disposed in order to keep the weight balance (rotation balance) of the CD 3 or the DVD 1, as shown in FIG. 12, for example. As shown in FIG. 13, one or more holes (holes for adjusting the weight balance) may be formed in a substrate in the inner peripheral portion 15 in the vicinity of a portion, at which the weight is increased because the antenna wire or the IC chip 24 is disposed, to decrease the weight of this portion, whereby the rotation balance of the DVD 1 or the CD 3 can be kept.

Figure 14:
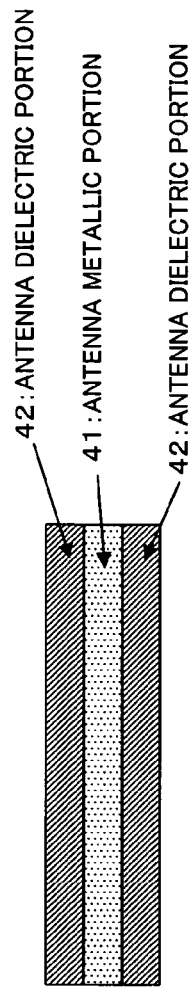
FIG. 14 is a schematic sectional view showing a structure of an antenna disposed in the inner peripheral potion of the dielectric member in the structures shown in FIGS. 9(A), 9(B), 10(A), 10(B) and 11 through 13.

As shown in a schematic sectional view in FIG. 14, for example, the above antenna 4 (antenna wire) may have a structure including an antenna metallic portion 41 and dielectric portions (antenna dielectric portions) 42 formed on the both sides (or one side) of the antenna metallic portion 41.

By forming the dielectric portion 42 on the both sides or one side of the antenna metallic portion 41, it is possible to shorten the wavelength of the received signal and decrease the necessary length of the antenna wire, whereby a decrease in size of the antenna is realized in this case, as well. Since the polycarbonate, which is the dielectric member of the DVD 1 or the CD 3, has a relative dielectric constant $\epsilon_r$ of 2.94, a dielectric portion having a larger relative dielectric constant is formed on the both sides or one side of the antenna metallic portion 41, thereby to decrease the size as compared with a case where polycarbonate is used as the dielectric portion of the antenna 4, for example.

In concrete, when alumina (relative dielectric constant=10) having a thickness of about 0.6 mm is formed on the both sides of the antenna metallic portion 41, the size of the antenna can be decreased by 0.7 times as compared with a case where polycarbonate (relative dielectric constant=2.94) of the DVD 1 or the CD 3 is used as the dielectric portion.

Figure 15:
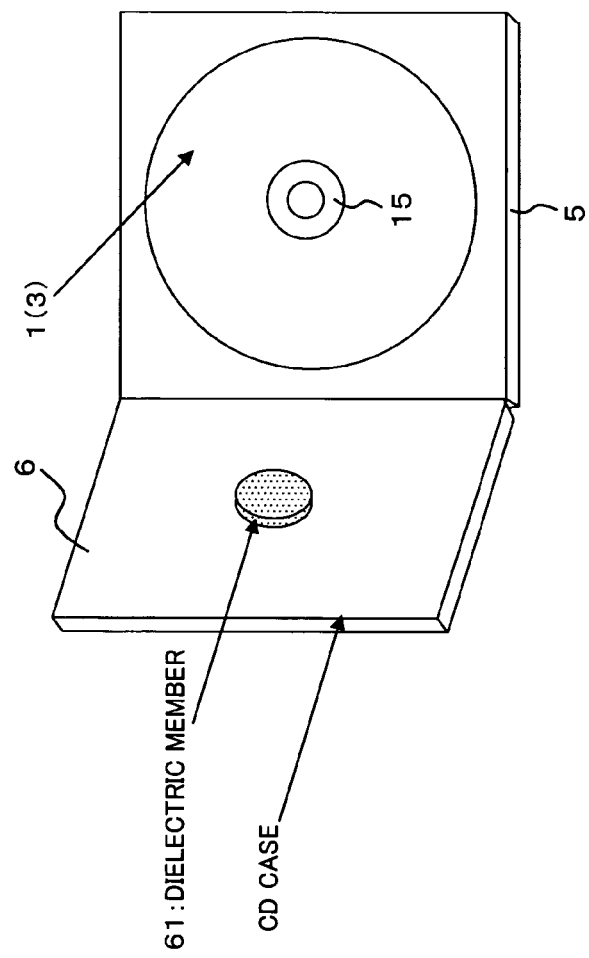
FIG. 15 is a schematic view showing an appearance of a containing case for a DVD or CD, where a dielectric member for the antenna provided to the DVD or CD is attached to the case.

As schematically shown in FIG. 15, for example, when a dielectric member 61 having a larger relative dielectric constant than the relative dielectric constant of the air ($\epsilon_r$=1) is formed at the center of a lid 6 (on the inner surface of a lid 6 coinciding with the inner peripheral portion 15 of the DVD 1 or the CD 3 when the lid 6 is closed) of a case (article case) 5 for the DVD 1 or the CD 3, the dielectric member 61 closely contacts with the upper surface of the antenna 4 disposed in the inner peripheral portion 15 when the DVD 1 or the CD 3 is contained in the case 5 and the lid 6 is closed. In this case, it is possible to decrease the size of the antenna, as well. In this case, when the relative dielectric constant of the dielectric member 61 is larger than 1, the size of the antenna can be decreased. The larger the value, the more the size of the antenna can be decreased, although the magnitude of the relative dielectric constant is not specifically designated. For example, when alumina (relative dielectric constant=10) having a thickness of 2 mm is formed as the dielectric member 61 on the inner surface of the lid 6, the size of the antenna can be decrease by 0.63 times as compared with a case where the alumina is not formed (air).

The dielectric member 61 may be formed on, not the lid 6, but a portion (the bottom of the case) of the case 5 coinciding with the inner peripheral portion 15 of the DVD 1 (CD 3). Alternatively, the dielectric member 61 may be formed on both the lid 6 and the case. When the dielectric member 61 is formed on the both, the size of the antenna can be further decreased.

By decreasing the size of the antenna, it is possible to improve the degree of freedom of the antenna pattern (shape) disposed in the inner peripheral portion 15. By forming the antenna pattern in small size at a position close to the center of the inner peripheral portion 15, the antenna pattern can be kept away from the reflective layer 12 or the recording layer (metal layer) of the DVD 1 or the CD 3. Whereby, an effect of the metal layers on the antenna 4 can be minimized as much as possible.

As the small antenna 4 disposed in the inner peripheral portion 15 of the DVD 1 or the CD 3, a fractal antenna, a spiral antenna, a log-periodic antenna or the like may be employed other than the above examples, of course.

(C) Description of Batch Reading of DVDs 1 (CDs 3) with Radio Tags (Antennas)

In these years, use of radio tags is proposed as a management system for parts or stock in the production field or the distribution field. When production or distribution of optical recording media such as DVDs 1 or CDs 3 is managed, there is a demand to collectively read at a time as many radio tags as possible attached to stacked DVDs 1 or CDs 3. When a large number of DVDs 1 or CDs 3 are stacked, there is possibility that the structure of the reading system becomes complicated because of an effect of the metal layers such as the reflective layer 12, the recording layer and the like of the DVD 1 or the CD 3.

Figure 16:
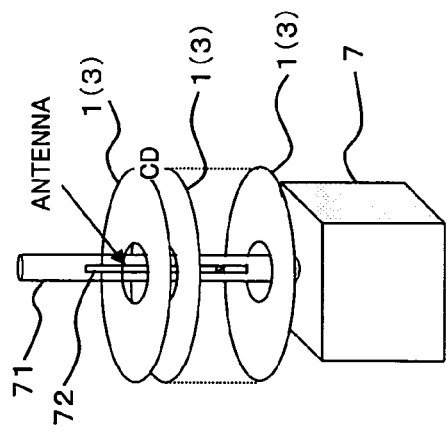
FIG. 16 is a schematic view showing a reader/writer antenna system according to the first and second embodiments.
Figures 17A, 17B, 17C:
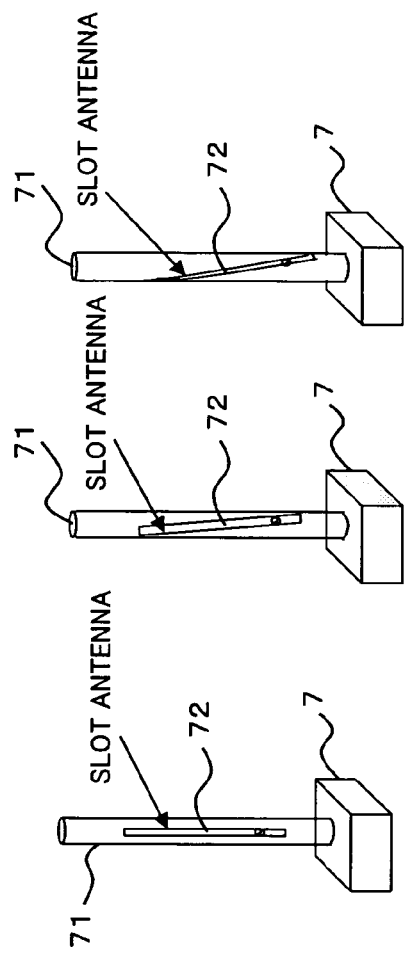
FIGS. 17(A) through 17(C) are schematic views showing shapes of slots (antennas) formed in a holder shown in FIG. 16.

For this, here is proposed a reader/writer antenna system 7 as schematically shown in FIG. 16, for example. The antenna system 7 comprises a hollow cylindrical holder (waveguide) 71 having a diameter smaller than the diameter of a hole formed at the center of an optical recording disk medium such as the DVD 1, the CD 3 or the like. A number of DVDs 1 or CDs 3 can be stacked on the holder with the center axes of the DVDs 1 or the CDs 3 being agreed.

The entire or the outer surface or the inner surface of the holder 71 is conductive. A narrow slot of about $\lambda/2$ is formed, linearly [refer to FIG. 17(A)] or obliquely [refer to FIG. 17(B)] or spirally [refer to FIG. 17(C)], in the longitudinal direction of the holder 71 to form a slot antenna 72.

The holder 71 communicates with the radio tags (the antennas 2, 2' or 4 described above) of the DVDs 1 or the CDs 3 stacked on the holder 71 through the slot antenna 72, whereby it is possible to collectively read a number of the DVDs 1 or the CDs 3, and authenticate (manage the production or distribution of) a number of the DVDs 1 or the CDs 3 within a short period of time.

Since the antenna system 7 communicates with the radio tags through the hole formed at the center of a DVD 1 or a CD 3, it is possible to diminish the effect of the metal layers such as the reflective layer 12, the recording layer and the like of the DVD 1 or the CD 3, thus improve the reading performance.

Note that this invention is not limited to the above examples, but may be modified in various ways without departing from the scope of the invention, of course.

As described above in detail, this invention can provide a radio tag antenna structure for an optical recording medium which is simple, is small-sized, and can secure necessary reading performance. This invention is considered to be very useful in technical fields of production management, goods management, burglarproofing, and so forth of optical recording media using radio tags.

The invention claimed is:

1. A radio tag antenna structure for an optical recording medium having an antenna structure comprising an antenna pattern on one surface of a dielectric member and a ground pattern on the other surface of said dielectric member, and attached to said optical recording medium having a dielectric layer and a metal layer on the side from which a laser beam does not come in, said radio tag antenna structure further comprising:
   a communication circuit chip which is to be connected to said antenna pattern being formed on a surface of said dielectric layer of said optical recording medium so that a ground terminal of said communication circuit chip is connected to said metal layer of said optical recording medium through a through hole formed in said dielectric layer of said optical recording medium,
   wherein said antenna pattern is formed on a surface of or inside said dielectric layer of said optical recording medium so that said metal layer (12) of said optical recording medium is used as said ground pattern in said antenna structure.

2. A radio tag antenna structure for an optical recording medium having an antenna structure comprising an antenna pattern on one surface of a dielectric member and a ground pattern on the other surface of said dielectric member, and attached to said optical recording medium having a dielectric layer and a metal layer on the side from which a laser beam does not come in, said radio tag antenna structure further comprising:
   a communication circuit chip which is to be connected to said antenna pattern being implanted in said dielectric layer of said optical recording medium so that a ground terminal of said communication circuit chip is connected to said metal layer of said optical recording medium.

3. A radio tag antenna structure for an optical recording medium which is an antenna structure for a radio tag attached to an optical recording disk medium having a dielectric layer and a metal layer,
   wherein a pan or the whole of an antenna is implanted in a portion of said dielectric layer on which said metal layer is not fanned in said optical recording disk medium,
   wherein said optical recording disk medium symmetrically has said dielectric layer and said metal layer about an adhesive layer, and said antenna is implanted in said adhesive layer on which said metal layer is not formed in said optical recording disk medium,
   wherein said antenna is implanted in said adhesive layer at an inner peripheral portion of said optical recording disk medium, and
   wherein said antenna is configured as a curved antenna having a curved shape along an inner periphery of said optical recording disk medium, said radio tag antenna structure further comprising:
   a communication circuit chip which is to be connected to said curved antenna being disposed at an inner peripheral portion of said optical recording disk medium so that a ground of said communication circuit chip is connected to said metal layer of said optical recording disk medium.

4. The radio tag antenna structure for an optical recording medium according to claim 3, wherein said curved antenna is configured as a monopole antenna whose antenna line extends in one direction along said inner periphery of said optical recording disk medium.

5. The radio tag antenna structure for an optical recording medium according to claim 3, wherein said curved antenna is configured as a dipole antenna whose antenna line extends in the both directions along said inner periphery of said optical recording disk medium.

6. The radio tag antenna structure for an optical recording medium according to claim 5, wherein said dipole antenna is configured as a folded dipole antenna formed by partly folding said antenna line along said inner periphery of said optical recording disk medium.

7. The radio tag antenna structure for an optical recording medium according to claim 6, wherein a width of said antenna line of said folded dipole antenna on the outer peripheral side is greater than a width of said antenna line of the same on the inner peripheral side.

8. The radio tag antenna structure for an optical recording medium according to claim 5, wherein said antenna line is formed into a wavy shape.

9. The radio tag antenna structure for an optical recording medium according to claim 3 further comprising:
   a dummy chip for maintaining a balance of rotation of said optical recording disk medium or another communication circuit chip disposed at a position in said inner peripheral portion symmetrical to a position at which said communication circuit chip is disposed.

10. The radio tag antenna structure for an optical recording medium according to claim 3 further comprising:
    one or more holes for maintaining a balance of rotation of said optical recording disk medium formed in said inner peripheral portion in die vicinity of a position at which said communication circuit chip is disposed.

11. A radio tag antenna structure for an optical recording medium, which is an antenna structure for a radio tag attached to an optical recording disk medium having a dielectric layer and a metal layer,
    wherein a part or the whole of an antenna is implanted in a portion of said dielectric layer on which said metal layer is not formed in said optical recording disk medium,
    wherein said antenna is disposed on said dielectric layer at an inner peripheral portion of said optical recording disk medium, and
    wherein said antenna is configured as a curved antenna having a curved shape along an inner periphery of said optical recording disk medium, said radio tag antenna structure further comprising:
    a communication circuit chip which is to be connected to said curved antenna being disposed at an inner peripheral portion of said optical recording disk medium so that a ground of said communication circuit chip is connected to said metal layer of said optical recording disk medium.

12. The radio tag antenna structure for an optical recording medium according to claim 11, wherein said curved antenna is configured as a monopole antenna whose antenna line extends in one direction along said inner periphery of said optical recording disk medium.

13. The radio tag antenna structure for an optical recording medium according to claim 11, wherein said curved antenna is configured as a dipole antenna whose antenna line extends in the both directions along said inner periphery of said optical recording disk medium.

14. The radio tag antenna structure for an optical recording medium according to claim 13, wherein said dipole antenna is configured as a folded dipole antenna formed by partly folding said antenna line along said inner periphery of said optical recording disk medium.

15. The radio tag antenna structure for an optical recording medium according to claim 14, wherein a width of said antenna line of said folded dipole antenna on the outer peripheral side is greater than a width of said antenna line of the same on the inner peripheral side.

16. The radio tag antenna structure for an optical recording medium according to claim 11 further comprising:
    a dummy chip for maintaining a balance of rotation of said optical recording disk medium or another communication circuit chip disposed at a position in said inner peripheral portion symmetrical to a position at which said communication circuit chip is disposed.

17. The radio tag antenna structure for an optical recording medium according to claim 11 further comprising:
    one or more holes for maintaining a balance of rotation of said optical recording disk medium formed in said inner peripheral portion in the vicinity of a position at which said communication circuit chip is disposed.

18. A radio tag antenna structure far an optical recording medium, which is an antenna structure for a radio tag attached to an optical recording disk medium having a dielectric layer and a metal layer, wherein a part or the whole of an antenna is implanted in a portion of said dielectric layer on which said metal layer is not formed in said optical recording disk medium, and wherein said antenna comprises:

an antenna metallic portion; and an antenna dielectric portion formed on one or both surfaces of said antenna metallic portion, and having a relative dielectric constant greater than a relative dielectric constant of said dielectric layer of said optical recording disk medium.

* * * * *